United States Patent
Wrathall

(12) 
(10) Patent No.: US 6,424,132 B1
(45) Date of Patent: Jul. 23, 2002

(54) ADDING A LAPLACE TRANSFORM ZERO TO A LINEAR INTEGRATED CIRCUIT FOR FREQUENCY STABILITY

(75) Inventor: Robert S. Wrathall, Scotts Valley, CA (US)

(73) Assignee: Micrel, Incorporated, San Jose, CA (US)

( * ) Notice: Subject to any disclaimer, the term of this patent is extended or adjusted under 35 U.S.C. 154(b) by 0 days.

(21) Appl. No.: 09/949,148

(22) Filed: Sep. 7, 2001

Related U.S. Application Data

(63) Continuation-in-part of application No. 09/733,863, filed on Dec. 8, 2000, now Pat. No. 6,304,067.

(51) Int. Cl.[7] .................................................. G05F 1/40
(52) U.S. Cl. ...................................... 323/282; 323/285
(58) Field of Search ............................... 323/222, 266, 323/271, 273, 282, 285, 286

(56) References Cited

U.S. PATENT DOCUMENTS

| | | | |
|---|---|---|---|
| 5,382,918 A | 1/1995 | Yamatake | 330/260 |
| 5,514,947 A | 5/1996 | Berg | 323/282 |
| 5,770,940 A | 6/1998 | Goder | 323/282 |
| 5,889,393 A | 3/1999 | Wrathall | 323/282 |
| 5,894,243 A | 4/1999 | Hwang | 327/540 |
| 6,150,804 A | 11/2000 | Taghizadeh-Kaschani | 323/285 |
| 6,232,755 B1 * | 5/2001 | Zhang | 323/282 |
| 6,348,783 B2 * | 2/2002 | Tateishi | 323/285 |

* cited by examiner

*Primary Examiner*—Matthew Nguyen
(74) *Attorney, Agent, or Firm*—Skjerven Morrill LLP

(57) ABSTRACT

A compensation circuit for introducing a zero in a first circuit being incorporated in a closed loop feedback system includes a first capacitor, an amplifier and a second capacitor, connected in series between an input node and a summing node in the first circuit. In one embodiment, the summing node is coupled to a summing circuit disposed between two gain stages of an error amplifier in the first circuit. In another embodiment, the summing node is coupled to the output node of the error amplifier. The amplifier amplifies the capacitance of the second capacitor to introduce a zero in the first circuit having effectiveness over a wide frequency range. The compensation circuit can be applied to a switching regulator controller for adding an effective zero in the feedback system of a switching regulator for compensating a double-pole introduced by a LC filter circuit in the switching regulator feedback system.

71 Claims, 14 Drawing Sheets

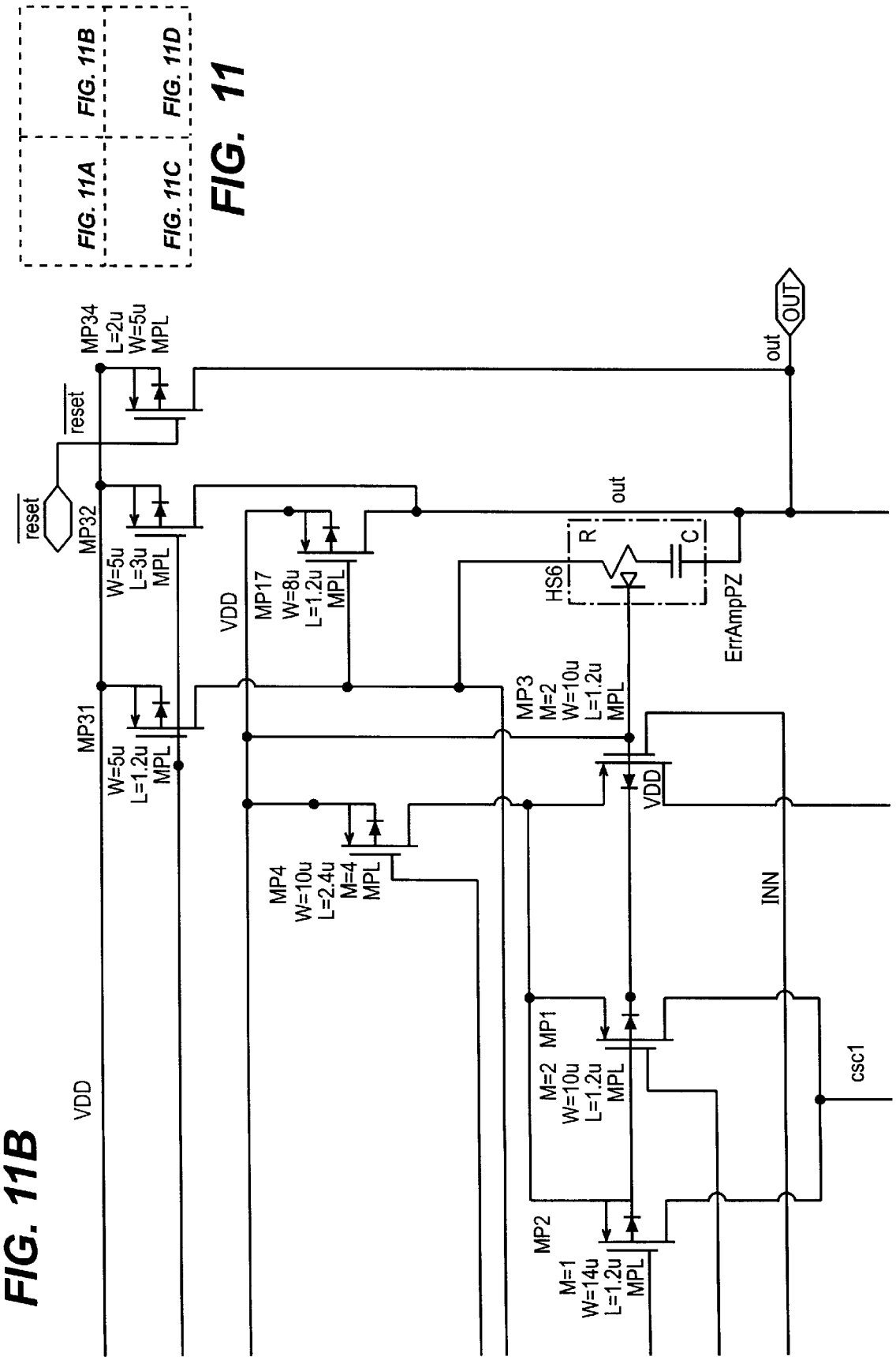

ADDING A LAPLACE TRANSFORM ZERO TO A LINEAR INTEGRATED CIRCUIT FOR FREQUENCY STABILITY

CROSS-REFERENCE TO RELATED APPLICATION

This is a continuation-in-part of co-pending U.S. application Ser. No. 09/733,863, entitled "Adding A Laplace Transform Zero To A Linear Integrated Circuit For Frequency Stability," filed on Dec. 8, 2000, by Robert S. Wrathall, now U.S. Pat. No. 6,304,067, which application is incorporated herein by reference in its entirety.

BACKGROUND OF THE INVENTION

1. Field of the Invention

The invention relates to a circuit and method for adding a Laplace transform zero to a linear integrated circuit, and more particularly to a circuit and method for adding a Laplace transform zero in a switching regulator feedback loop for providing frequency stability.

2. Description of the Related Art

Closed loop negative feedback systems are commonly employed in linear integrated circuits. For instance, switching regulators use a feedback loop to monitor the output voltage in order to provide regulation. To ensure stability in any closed loop system, the Nyquist criterion must be met. The Nyquist criterion states that a closed loop system is stable if the phase shift around the loop is less than 180 degrees at unity gain. Typically, a compensation circuit is added to a feedback loop to modulate the phase shift of the feedback loop to obtain stability.

The frequency response of a linear circuit can be characterized by the presence of "poles" and "zeros." A "pole" is a mathematical term which signifies the complex frequency at which gain reduction begins. On the other hand, a "zero" signifies the complex frequency at which gain increase starts. Poles and zeros on the left half plane of a complex frequency plane or s-plane are considered normal and can be compensated. However, poles and zeros on the right half plane of a complex frequency plane are usually problematic and difficult to manipulate and is not addressed in the present application. Generally, a pole contributes a −90° phase shift while a zero contributes a +90° phase shift. A pole cancels out the phase shift of a zero for zeros in the left half plane. In designing a closed loop system with compensation, the location of the poles and zeros are manipulated so as to avoid a greater than 180° phase shift at unity gain.

In a linear circuit, poles are created by placing a small capacitor on a node with a high dynamic impedance. If the capacitor is placed at a gain stage, the capacitance can be multiplied by the gain of the stage to increase its effectiveness. Each pole has a zero associated with it. That is, at some point, the dynamic resistance of the gain stage will limit the gain loss capable of being achieved by the capacitor. Thus, a zero can be created by placing a resistor in series with the gain reduction capacitor.

A conventional voltage mode switching regulator uses an inductor-capacitor (LC) network at the voltage output terminal for filtering the regulated output voltage to produce a relatively constant DC output voltage. FIG. 1 is a schematic diagram of a conventional switching regulator including a switching regulator controller 10 and an LC circuit 11. Switching regulator controller 10 generates a regulated output voltage $V_{SW}$ at an output terminal 13 which is coupled to LC circuit 11 for providing a filtered output voltage $V_{OUT}$. The output voltage $V_{OUT}$ is coupled back to controller 10 at a feedback (FB) terminal 15 for forming a feedback control loop. The LC circuit has associated with it two poles, one pole associated with each element. If the feedback control loop is not compensated, LC circuit 11 alone contributes an −180° phase shift to the system and loop instability results, causing the output voltage to oscillate. Because virtually every switching regulator uses an LC filter circuit to filter the regulated output voltage, compensation must be provided in the feedback control loop of a switching regulator to compensate for the effect of the two poles introduced by the LC circuit.

A conventional compensation technique in switching regulators involves adding a circuit in series with the feedback loop which produces a Laplace zero. The zero is added to the feedback control loop to cancel out one of the two poles of the LC filter circuit, thus insuring closed loop stability. U.S. Pat. No. 5,382,918 to Yamatake describes using a capacitance multiplying op-amp to provide a large effective capacitance and a resistor in series as the frequency compensation element of a switching regulator. U.S. Pat. No. 5,514,947 to Berg describes a phase lead compensation circuit for providing additional phase to the loop gain of a switching regulator near the unity gain frequency. The phase lead compensation circuit of Berg uses a transconductance amplifier driving a frequency-dependent load, implemented as a band-limited op amp, in the feedback control loop of the switching regulator. These approaches are problematic because they both require a "high quality" differential amplifier in operation which are significantly large and complex to realize. In practice, differential amplifiers are typically large devices and can be relatively slow. Furthermore, the differential amplifiers tend to sink large amounts of current proportional to speed. The compensation approaches described by Yamatake and Berg are undesirable because the compensation techniques require sacrificing speed for closed loop stability. In addition the op-amp used in the compensation circuit needs to be compensated for stability itself, making the circuit more complex to implement.

FIG. 1 illustrates another approach for providing compensation in a feedback control loop of a switching regulator. Referring to FIG. 1, the output voltage $V_{OUT}$ is coupled to the feedback terminal 15 and further to a voltage divider including resistors $R_1$ and $R_2$. The operation of the feedback control loop in controller 10 is well known in the art. The voltage divider steps down output voltage $V_{OUT}$ and the divided voltage $V_R$ is coupled to an error amplifier 20 which compares the divided voltage $V_R$ to a reference voltage $V_{Ref}$. Error amplifier 20 generates an error output signal indicative of the difference between voltage $V_R$ and reference voltage $V_{Ref}$. The feedback control loop of controller 10 operates to regulate the output voltage $V_{OUT}$ based on the error output of error amplifier 20 so that voltage $V_R$ equals voltage $V_{Ref}$.

FIG. 2a is a plot of the loop gain magnitude vs. frequency in log scale for the switching regulator of FIG. 1 without any compensation. The low frequency loop gain is first reduced by a pole associated with error amplifier 20. The gain loss is modified by a zero also associated with the error amplifier. Then, at high frequency, the effect of the double-pole in the LC filter circuit causes a large loss in the loop gain such that the phase shift at unity gain is equal to or greater than 180°. The feedback control loop of the uncompensated switching regulator of FIG. 1 is unstable unless the gain is substantially reduced.

In the switching regulator of FIG. 1, a capacitor 18 (typically referred to as a "zero capacitor") is connected in parallel to resistor $R_1$ of the voltage divider. Capacitor 18 introduces a zero-pole pair in the feedback loop. The location (or frequency) of the zero-pole pair is determined by the resistance of the voltage divider and the capacitance of capacitor 18. For practical resistance and capacitance values, the zero and pole introduced by capacitor 18 are typically located close to each other so that the zero is canceled out quickly by the nearby associated pole. FIG. 2b is a plot of the loop gain magnitude vs. frequency in log scale in the switching regulator of FIG. 1 incorporating zero capacitor 18. Here, the operation of the zero capacitor ensures that the phase shift is less than 180° near unity gain. However, the compensation provided by zero capacitor 18 is limited and often does not provide sufficient phase margin at unity gain. For example, at high frequency, zero capacitor 18 shorts out resistor $R_1$, resulting in no or minimal gain loss in the feedback loop. Thus, the compensation provided by capacitor 18 is not effective at high frequency. Also, the voltage divider of resistors $R_1$ and $R_2$ typically provides only a gain loss of 3 dB. The 3 dB gain loss limits the ratio of the pole to zero angular frequency of capacitor 18, and thus, limits the compensation range capable of being achieved by the use of a single zero capacitor 18. The feedback loop of switching regulator of FIG. 1 is susceptible to instability when the switching regulator is subjected to fluctuations in load impedance because of this limited compensation range.

Thus, it is desirable to provide a compensation circuit in a feedback loop of a linear circuit which is capable of providing effective pole cancellation.

SUMMARY OF THE INVENTION

According to one aspect of the present invention, a switching regulator controller circuit includes an output terminal providing a signal corresponding to a regulated output voltage and a feedback terminal for receiving a first voltage corresponding to the regulated output voltage. The controller circuit further includes an error amplifier having a first input node coupled to receive a feedback voltage corresponding to the first voltage, a second input node coupled to a reference voltage, and an error output node providing an error voltage indicative of the difference between the feedback voltage and the reference voltage. The controller circuit also includes a control circuit including an input node receiving the error voltage and an output node generating the signal corresponding to the regulated output voltage in response to the error voltage, the control circuit coupling the signal to the output terminal.

The controller circuit includes a compensation circuit for introducing a zero in the circuit for frequency stabilization. The compensation circuit includes a first capacitor coupled between the first input node of the error amplifier and a first node where the first capacitor blocks out the DC component of the feedback voltage, an amplifier coupled between the first node and a second node, and a second capacitor coupled between the second node and the first input node of the error amplifier. The compensation circuit introduces a zero at the first input node of the error amplifier.

In another embodiment, the second capacitor of the compensation circuit is coupled between the second node and a third node coupled to a summing circuit. The compensation circuit introduces a zero at a summing node of the summing circuit for summing a voltage corresponding to the zero and the error voltage of the error amplifier.

In yet another embodiment, the error amplifier includes a first gain stage, a summing circuit and a second gain stage. The second capacitor of the compensation circuit is coupled between the second node and a summing node coupled to the summing circuit of the error amplifier. The compensation circuit thus introduces a zero at the summing node of the error amplifier.

According to another aspect of the present invention, a compensation circuit for introducing a zero in a first circuit being incorporated in a closed loop feedback system is provided. The first circuit includes a first terminal generating a first voltage for the closed loop feedback system and a feedback terminal for receiving a second voltage from the closed loop feedback system. The first circuit also includes an input node receiving a feedback voltage corresponding to the second voltage where the input node is coupled to an error amplifier.

The compensation circuit includes a first capacitor coupled between the input node in the first circuit and a first node where the first capacitor blocks out the DC component of the feedback voltage, an amplifier coupled between the first node and a second node, and a second capacitor coupled between the second node and a summing node in the error amplifier. The summing node is coupled to a summing circuit disposed between a first gain stage and a second gain stage of the error amplifier in the first circuit.

The compensation circuit amplifies the capacitance of the second capacitor and introduces a zero in the first circuit effective for pole-cancellation in the closed loop feedback system. Furthermore, the zero introduced by the compensation circuit has effectiveness over a wide range of frequencies.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In accordance with the present invention, a zero generation circuit for adding a Laplace transform zero in a linear or analog circuit includes a blocking capacitor and an open loop amplifier coupled to a zero capacitor for multiplying the capacitance of the zero capacitor. The zero generation circuit provides a wide band and effective zero for pole cancellation in a linear circuit for obtaining frequency stability. The zero generation circuit of the present invention has the advantages of consuming a small circuit area and being power efficient, drawing only a small bias current. Furthermore, the zero generation circuit can operate at high frequency to provide compensation for a large frequency range. The zero generation circuit of the present invention can be applied in switching voltage regulators and other closed loop feedback systems with multiple poles for introducing an effective "zero" compensation and improving frequency stability.

In the present description, a "zero" and a "pole" have meanings well understood by one skilled in the art. Specifically, a "zero" refers to the complex frequency at which the frequency response of a linear circuit has a zero amplitude, and a "pole" refers to the complex frequency at which the frequency response of a linear circuit has an infinite amplitude. In a feedback system, a pole signifies the frequency at which gain reduction begins while a zero signifies the frequency at which gain increase starts.

Figure 3:
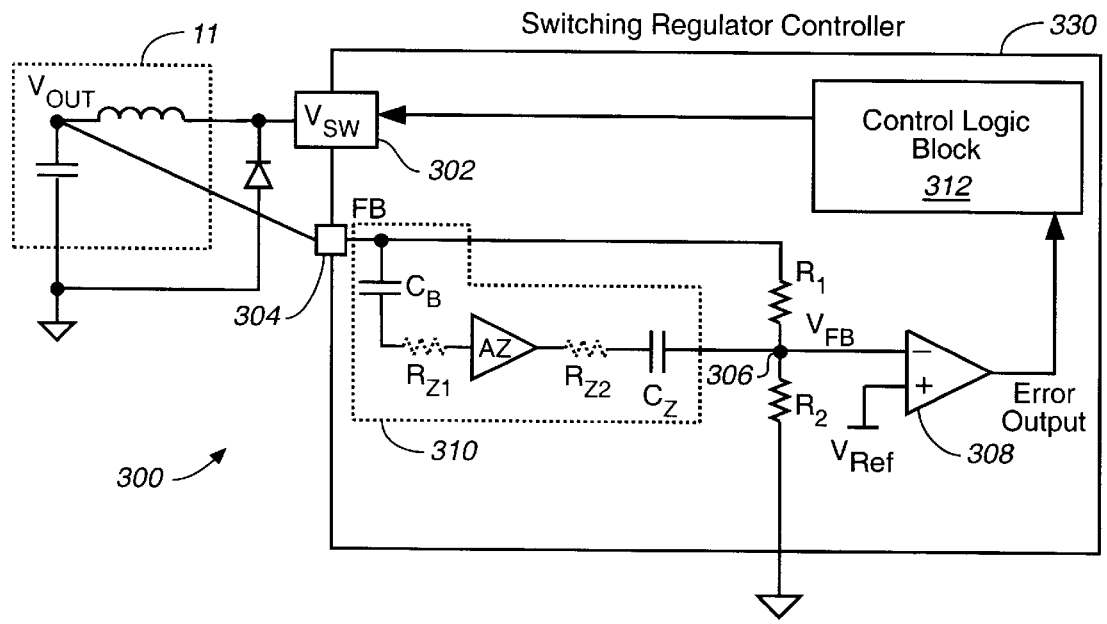
FIG. 3 is a schematic diagram of a switching regulator including a switching regulator controller incorporating a zero generation circuit according to one embodiment of the present invention.

FIG. 3 is a schematic diagram of a switching regulator including a switching regulator controller incorporating a zero generation circuit according to one embodiment of the present invention. The circuitry of switching regulator controller 330 is conventional except for the zero generation circuit 310. Switching regulator controller 330 generates a regulated output voltage $V_{SW}$ on an output terminal 302. The regulated output voltage $V_{SW}$ is coupled to an LC filter circuit 11 to generate an output voltage $V_{OUT}$ having substantially constant magnitude. Switching regulator 300, constructed using controller 330 and LC circuit 11, forms a closed loop feedback system for regulating output voltage $V_{SW}$ and consequently, the output voltage $V_{OUT}$. The output voltage $V_{OUT}$ from LC filter circuit 11 is fed back to controller 330 on a feedback terminal 304. Typically, the output voltage $V_{OUT}$ is coupled to a voltage divider including resistors $R_1$ and $R_2$ and generating a feedback voltage $V_{FB}$ at a divider output node 306. The voltage divider functions to step down the output voltage $V_{OUT}$ to a reference voltage level $V_{Ref}$ at output node 306. The stepped down feedback voltage $V_{FB}$ is coupled to the control circuitry of controller 330. In FIG. 3, the control circuitry of controller 330 is illustrated as including an error amplifier 308 and a control logic block 312. The feedback voltage $V_{FB}$ is coupled to the inverting terminal of error amplifier 308. A reference voltage $V_{Ref}$ is coupled to the non-inverting input terminal of error amplifier 308. The error output generated by error amplifier 308 is coupled to control logic block 312 for regulating the regulated output voltage $V_{SW}$ on node 302. Control logic block 312 is conventional and numerous implementations are possible. Typically, control logic block 312 includes a logic control circuit and one or more switching transistors. If controller 330 is operating in a PWM mode, control logic block 312 may further include a PWM comparator to which the error output is coupled. The schematic diagram of FIG. 3 is simplified to better illustrate the principles of the present invention. It is understood by one skilled in the art that, in actual implementation, switching regulator controller 330 may include additional terminals and circuitry for the specific application.

In the feedback loop of switching regulator 300, error amplifier 308 has associated with it a pole and a zero. The pole and zero within error amplifier 308 are typically easy to generate because error amplifier 308 includes high impedance nodes. However, it is difficult to generate more than one pole or zero within error amplifier 308. On the other hand, LC filter circuit 11 introduces two poles to the feedback loop of switching regulator 300 which need to be compensated. In the present embodiment, a zero generation circuit 310 is incorporated in controller 330 to introduce a zero to the feedback loop of switching regulator 300, in addition to the zero generated by the error amplifier. Zero generation circuit 310 functions to ensure that the feedback system of switching regulator 300 meets the Nyquist criterion for frequency stability.

According to one embodiment of the present embodiment, zero generation circuit 310 includes a blocking capacitor $C_B$, an amplifier AZ, and a zero capacitor $C_Z$, connected in series between feedback terminal 304 and feedback voltage $V_{FB}$ (node 306). In FIG. 3, circuit 310 is illustrated with a resistor $R_{Z1}$ between capacitor $C_B$ and amplifier AZ and with a resistor $R_{Z2}$ between amplifier AZ and capacitor $C_Z$ drawn in dotted line. Resistors $R_{Z1}$, and $R_{Z2}$ are illustrative only and are used to represent the equivalent input impedance and the equivalent output impedance, respectively, of amplifier AZ. Although resistors $R_{Z1}$ and $R_{Z2}$ are not meant to be actual elements or components in an actual implementation of circuit 310, circuit 310 may include resistors as needed for the implementation of amplifier AZ or for other purposes. As will be explained in more detail below, one embodiment of amplifier AZ includes an input resistor $R_{Z1}$ which, when combined with the gain of the first gain stage in amplifier AZ, creates the input impedance $R_{Z1}$ shown in FIG. 3.

In operation, capacitor $C_B$ receives output voltage $V_{OUT}$ on feedback terminal 304 and functions to block out the DC component of output voltage $V_{OUT}$. Amplifier AZ amplifies the AC component of output voltage $V_{OUT}$ provided by capacitor $C_B$ before coupling the AC signal to zero capacitor $C_Z$. The amplification function performed by amplifier AZ has the effect of amplifying the capacitance of capacitor $C_Z$ such that capacitor $C_Z$ can be implemented as a smaller capacitor while capable of introducing an effective zero in the feedback system. Furthermore, the AC signal amplification provided by amplifier AZ is also capable of introducing a zero having a wide range of applicability so that the zero is effective over a wide band of frequency. The zero signal generated by capacitor $C_Z$ is summed with feedback voltage $V_{FB}$ at node 306 before the feedback voltage $V_{FB}$ is coupled to the control circuitry of controller 330. In FIG. 3, the summed feedback voltage is coupled to error amplifier 308.

The transfer function from the feedback voltage $V_{FB}$ to the error output (denoted voltage $V_{EOUT}$), in the limiting conditions of $R_1 \gg R_{Z2}$, $A_Z \gg 1$ and $r \sim 1$, is given as follows:

$$\frac{V_{FB}}{V_{EOUT}} \approx \frac{1}{r} \frac{(A_Z * C_Z * R_1 * s + 1)}{((R_1/r) * C_Z * s + 1)}, \quad (1)$$

where $A_Z$ is the gain of amplifier AZ, s is the complex frequency of the Laplace transform and r is given as:

$$r = \frac{R_1}{R_2} + 1. \quad (2)$$

Equation (1) above yields a pole and a zero angular frequency as follows:

$$\omega_Z = 1/A_Z * R_1 * C_Z, \text{ and} \quad (3)$$

$$\omega_P = 1/(R_1/r) * C_Z. \quad (4)$$

As can be seen from equation (3) above, resistor $R_1$ of the voltage divider of controller 330 provides the resistive load to capacitor $C_Z$ and amplifier AZ for adding a zero in the feedback system. On the other hand, while in equation (4), both resistors $R_1$ and $R_2$ are used to provide a resistive load for introducing the pole of zero generation circuit 310, resistor $R_2$ is not critical for the placement of the pole and can be omitted in other embodiments of the present invention. When resistor $R_2$ is omitted (that is, resistance of resistor $R_2$ is infinite), the factor r has a value of 1 (equation 2) and the angular frequency of the pole, $\omega_P$, depends only on the resistive load of $R_1$.

The ratio of pole angular frequency (equation 4 above) to the zero angular frequency (equation 3 above) is given as follows:

$$\frac{\omega_P}{\omega_Z} = A_Z * r. \quad (5)$$

By adjusting the gain $A_Z$ of amplifier AZ, a very effective and wide band zero for pole cancellation can be generated in the feedback system of switching regulator 300. Referring to equation (5) above, in a conventional feedback system without any "zero" amplification, i.e., when the gain $A_z$ is equal to 1, the ratio of the pole to zero angular frequency is equal to r and is approximately 2. On the other hand, in a feedback system employing zero generation circuit 310, even when amplifier AZ only has a modest gain of 10, a pole-to-zero frequency ratio of 20 can be obtained. Thus, the zero generation circuit of the present invention is effective in generating a zero with a much broader effective range than that can be obtained with the conventional compensation techniques.

Figure 1:
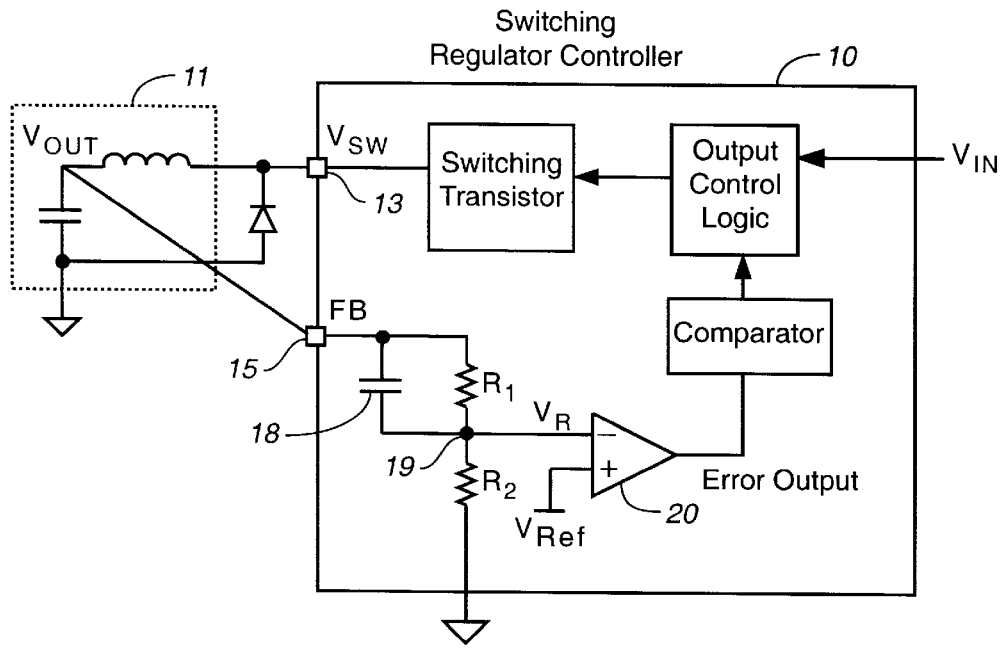
FIG. 1 is a schematic diagram of a conventional switching regulator including a zero capacitor for compensation.
Figure 2A:
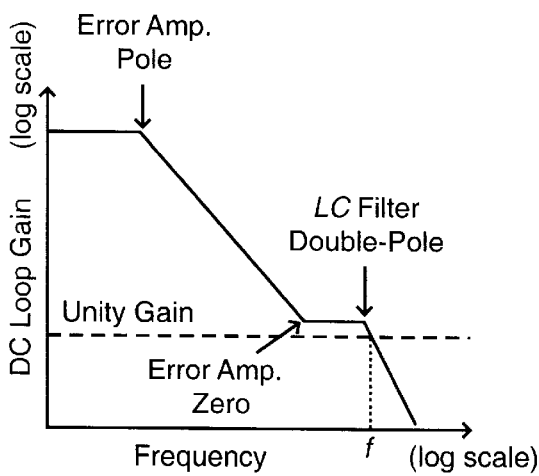
FIG. 2a is a loop gain vs. frequency plot for a conventional feedback system in a switching regulator without zero compensation.
Figure 2B:
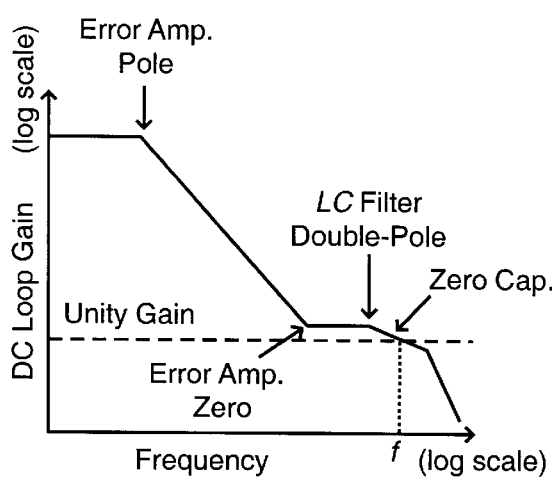
FIG. 2b is a loop gain vs. frequency plot for a feedback system in a switching regulator including a zero capacitor for compensation.
Figure 4:
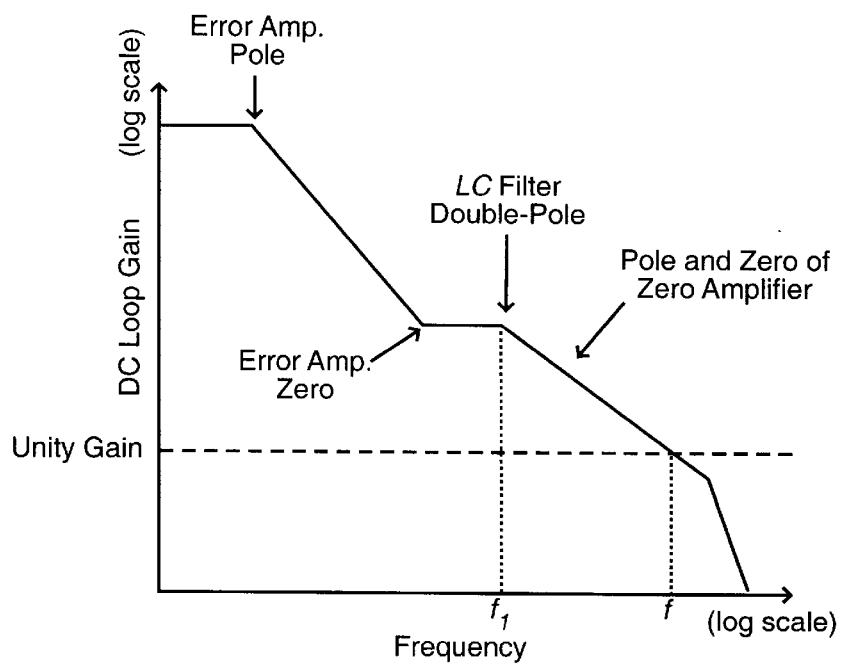
FIG. 4 is a loop gain vs. frequency plot for the feedback system of the switching regulator in FIG. 3.

FIG. 4 is a loop gain vs. frequency plot (in log scale) for the feedback system of the switching regulator of FIG. 3. FIG. 4 illustrates the effect on the loop gain vs. frequency behavior of switching regulator 300 after zero generation circuit 310 introduces a zero in the feedback system of the switching regulator. Referring to FIG. 4, the pole and zero of error amplifier 308 first diminishes the low frequency loop gain of switching regulator 300. At frequency $f_1$, the double-pole of LC filter circuit 11 takes effect. At high frequency, the zero introduced by zero generation circuit 310 (also called the "amplified zero") takes effect. If the onset of the effect of the amplified zero is perfectly matched to the position of double-pole LC filter circuit 11, then the amplified zero will cancel out the effect of one of the double poles. As shown in FIG. 4, the zero-pole pair of the amplified zero is spread much further apart in frequency range than that of the conventional single zero capacitor compensation circuit as shown in FIG. 2b. The wide-range spacing of the zero-pole pair of circuit 310 allows for a wider design latitude either for optimizing compensation or for increasing loop gain. Zero generation circuit 310 of the present invention amplifies the effect of the zero of zero capacitor $C_Z$. The action of amplifier AZ introduces a zero having a wide range of effectiveness. Therefore, the placement of the zero in the feedback system is not as critical as in conventional systems. Consequently, zero generation circuit 310 has more tolerance for variations in capacitance values of capacitor $C_Z$. Zero generation circuit 310 improves the overall performance of switching regulator 300.

Figure 5:
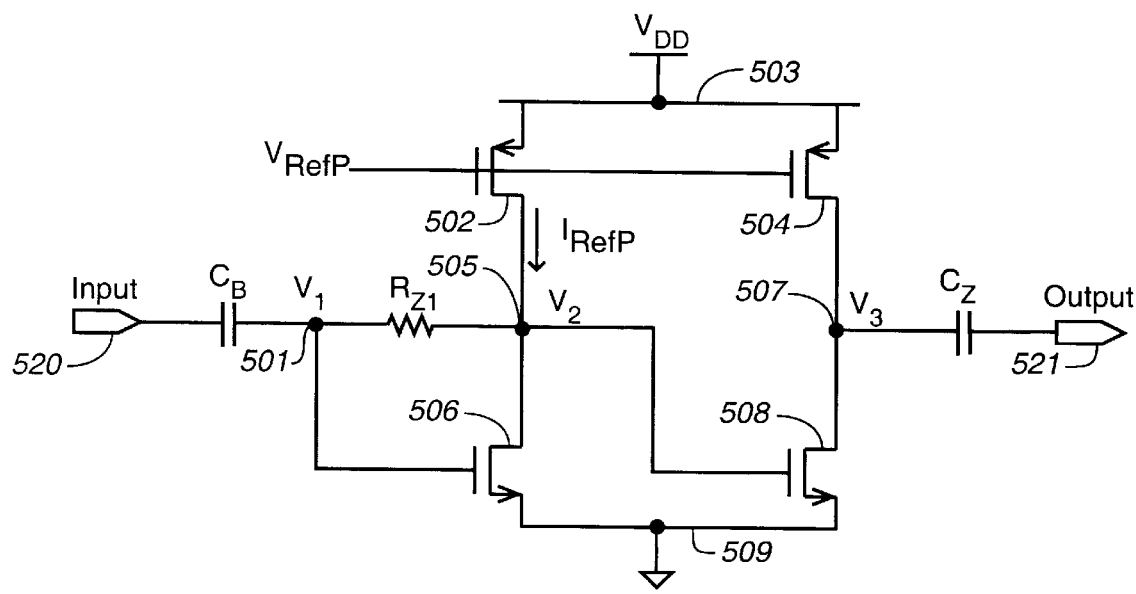
FIG. 5 is a circuit diagram of a zero generation circuit implemented using CMOS devices according to one embodiment of the present invention.

Amplifier AZ of zero generation circuit 310 is an open loop amplifier and can be implemented as any conventional gain stages known in the art. FIG. 5 is a circuit diagram of a zero generation circuit implemented using CMOS devices according to one embodiment of the present invention. Capacitors $C_B$ and $C_Z$ can be implemented as any conventional capacitor structures and in the present embodiment, capacitors $C_B$ and $C_Z$ are MOS capacitors. Capacitor $C_Z$ can have a capacitance value between 1 to 5 picofarads while capacitor $C_B$ has a capacitance value about one-fifth of capacitor $C_Z$. As described above, capacitor $C_B$ functions to block out the DC component of the output voltage $V_{OUT}$ presented at the circuit input node 520. Thus, the voltage $V_1$ at the other side of capacitor $C_B$ (node 501) is the AC component of the output voltage $V_{OUT}$. In the present embodiment, amplifier AZ is implemented as a two-stage gain block with self-biasing capability. The first gain stage includes a resistor $R_{Z1}$ coupled between nodes 501 and 505 and an NMOS transistor 506 biased by a current mirror. Resistor $R_{Z1}$ and the gain of the first gain stage create the effective input impedance $R_{Z1}$ of amplifier AZ. Resistor $R_{Z1}$ can be implemented as a diffused resistor or a polysilicon resistor. In the present embodiment, resistor $R_{Z1}$ is a diffused resistor having a resistance value of approximately 400 kΩ. The current mirror of the first gain stage is implemented by PMOS transistor 502. The gate terminal of transistor 502 is coupled to a reference voltage $V_{RefP}$ for generating a reference current $I_{refP}$ at the drain terminal (node 505) of transistor 502. The source terminal of transistor 502 is coupled to a power supply terminal 503 providing a supply voltage $V_{DD}$. NMOS transistor 506 has its gate terminal connected to node 501 and its drain and source terminals connected between node 505 and a ground node 509. Thus, transistor 506 amplifies the voltage $V_1$ and generates an output voltage $V_2$ at node 505. The second gain stage of amplifier AZ includes an NMOS transistor 508 biased by a current mirror including a PMOS transistor 504. PMOS transistor 504 is connected in an analogous manner as PMOS transistor 502 and generates a reference current $I_{refP}$ at the drain terminal (node 507) of transistor 504. NMOS transistor 508 has its gate terminal coupled to node 505 and amplifies the voltage $V_2$ to provide an output voltage $V_3$ at output node 507. The amplified voltage $V_3$ is coupled to zero capacitor $C_Z$. The action of amplifier voltage $V_3$ and zero capacitor $C_Z$ introduces a zero at a circuit output node 521 having more effectiveness than a zero introduced by conventional compensation circuits. In the present embodiment, PMOS transistors 502 and 504 are of the same sizes while NMOS transistors 506 and 508 are also of the same sizes. In one embodiment, PMOS transistors 502 and 504 each has a width of 20 μm and a length of 3 μm. On the other hand, NMOS transistors 506 and 508 each has a width of 6 μm and a length of 2 μm.

The zero generation circuit of the present invention achieves advantages not obtainable in conventional compensation circuits. First, the zero generation circuit utilizes common circuit components and is simple to implement. Contrary to conventional compensation techniques where a closed loop amplifier is used to set the proper gain and phase for the zero function, the zero generation circuit of the present invention simply modulates the location or placement of the zero generated by a zero capacitor. When applied in a switching regulator controller, the zero generation circuit of the present invention is connected to the voltage divider already present in the controller and requires little modification of the overall controller design. The circuit of the present invention avoids adding complex and space consuming compensation circuits to the switching regulator controller as is done the prior art. Second, the zero generation circuit is small in size and thus, is cost effective to incorporate in any linear circuits. Because the capacitance of zero capacitor $C_Z$ is amplified by the action of amplifier AZ, a small capacitor $C_Z$ can be used, resulting in a smaller circuit area in implementation. Through the use of CMOS devices and an open loop amplifier AZ, the zero generation circuit can be operated at very high frequency. Furthermore, the zero generated in the zero generation circuit of the present invention has effectiveness over a wide range of frequencies and thus the circuit can tolerate variations in manufacturing processes and fluctuations in the load impedance.

Figure 6:
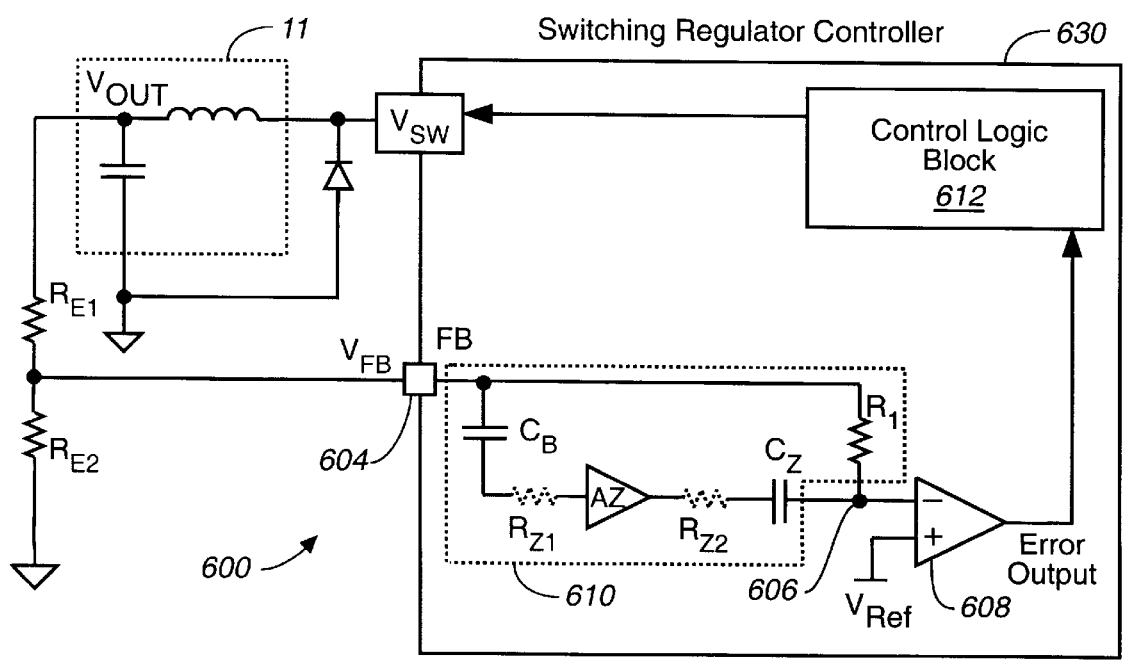
FIG. 6 is a schematic diagram of a switching regulator controller incorporating a zero generation circuit according to another embodiment of the present invention.

In the above embodiment, the zero generation circuit is incorporated in a controller for a fixed switching regulator having an internal voltage divider. As mentioned above, resistor $R_1$ of the voltage divider in controller 330 is used to provide a resistive load to zero generation circuit 310 for introducing an effective zero at node 306. In another embodiment of the present invention, the zero generation circuit of the present invention can also be incorporated in a switching regulator controller for an adjustable switching regulator as illustrated in FIG. 6. Referring to FIG. 6, in an adjustable switching regulator 600, an external voltage divider, including resistors $R_{E1}$ and $R_{E2}$, are used for stepping down the output voltage $V_{OUT}$. The output of the voltage divider of resistors $R_{E1}$ and $R_{E2}$ generates the feedback voltage $V_{FB}$ to be coupled to switching regulator controller 630 on a feedback terminal 604 to form the feedback loop for regulating the output voltage $V_{SW}$. In conventional switching regulator controllers, the feedback voltage $V_{FB}$ is coupled directly to error amplifier 608. However, in accordance with the present embodiment, a zero generation circuit 610 is incorporated into switching regulator controller 630 to generate an effective zero for compensating the double-pole of the LC filter circuit in the feedback system of adjustable switching regulator 600. In switching regulator controller 630, zero generation circuit 610 is coupled between feedback terminal 604 and a node 606 which is the inverting input terminal of error amplifier 608. The structure and operation of zero generation circuit 610 is the same as circuit 310 described above. Basically, capacitor $C_B$ blocks out the DC components of the feedback voltage $V_{FB}$ and amplifier AZ amplifies the AC components of the feedback voltage and couples the amplified voltage signal to zero capacitor $C_Z$. In the case of the adjustable switching regulator, zero generation circuit 610 further includes a resistor $R_1$ connected in parallel to the capacitors and amplifier circuit elements of the zero generation circuit (i.e. between node 604 and node 606). Resistor $R_1$ is used to provide a resistive load to zero generation circuit 610 for introducing an effective zero at node 606. In the present embodiment, the resistance of resistor $R_1$ is between 100 k to 200 k ohms. In one embodiment, resistor $R_1$ of circuit 610 is the same resistor $R_1$ in the voltage divider of switching regulator controller 330 of fixed switching regulator 300. Thus, controller 630 for an adjustable switching regulator can be built using the same circuit design as controller 330 for a fixed switching regulator except that, for controller 630, resistor $R_2$ of the voltage divider of controller 330 is disconnected from node 606. Zero generation circuit 610 generates a wide band zero for effective pole-cancellation in the feedback system of switching regulator 600 and ensures that the switching regulator can achieve frequency stability in operation.

Figure 8:
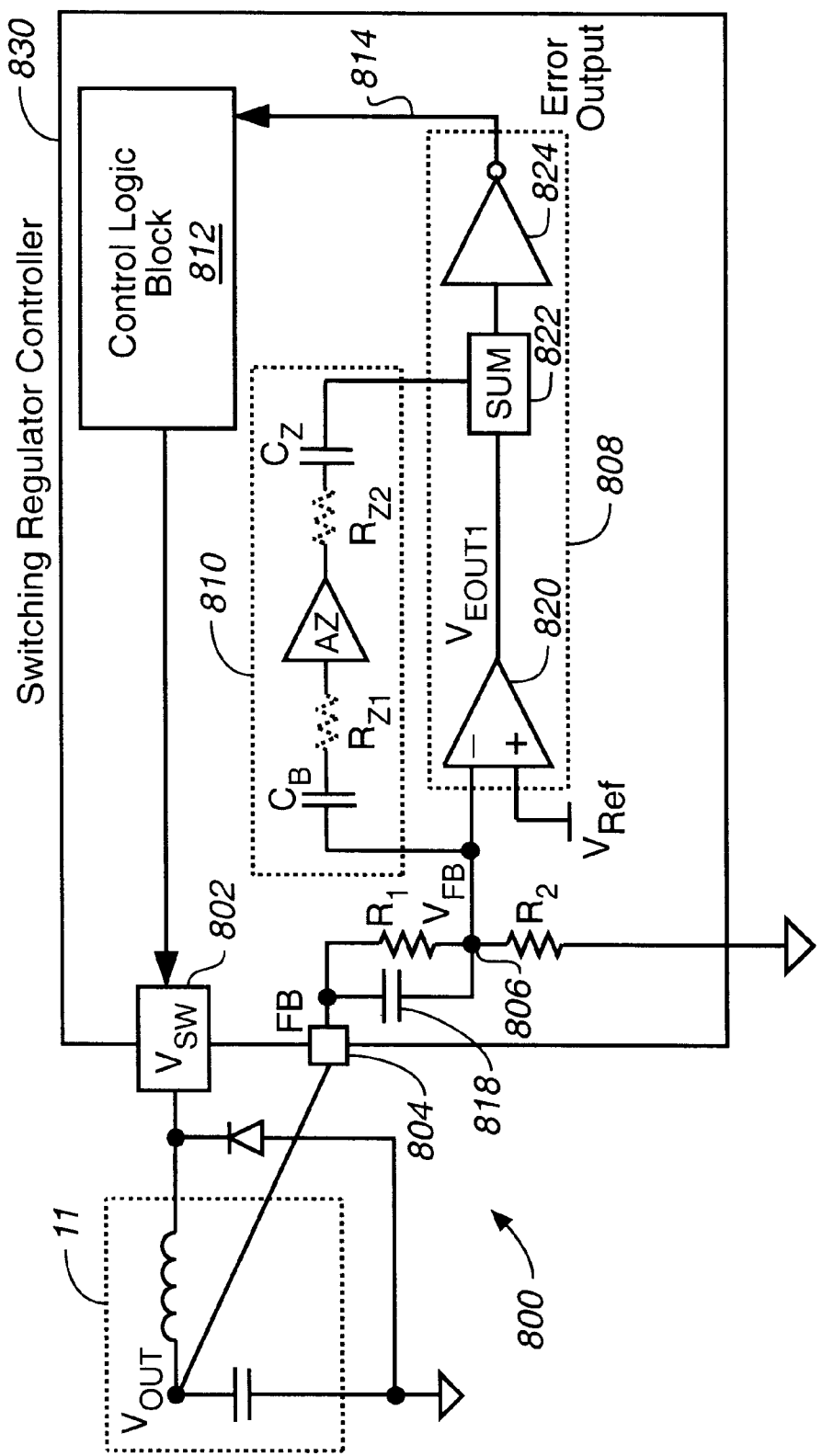
FIG. 8 is a schematic diagram of a switching regulator controller incorporating a zero generation circuit according to a second alternate embodiment of the present invention.
Figure 9:
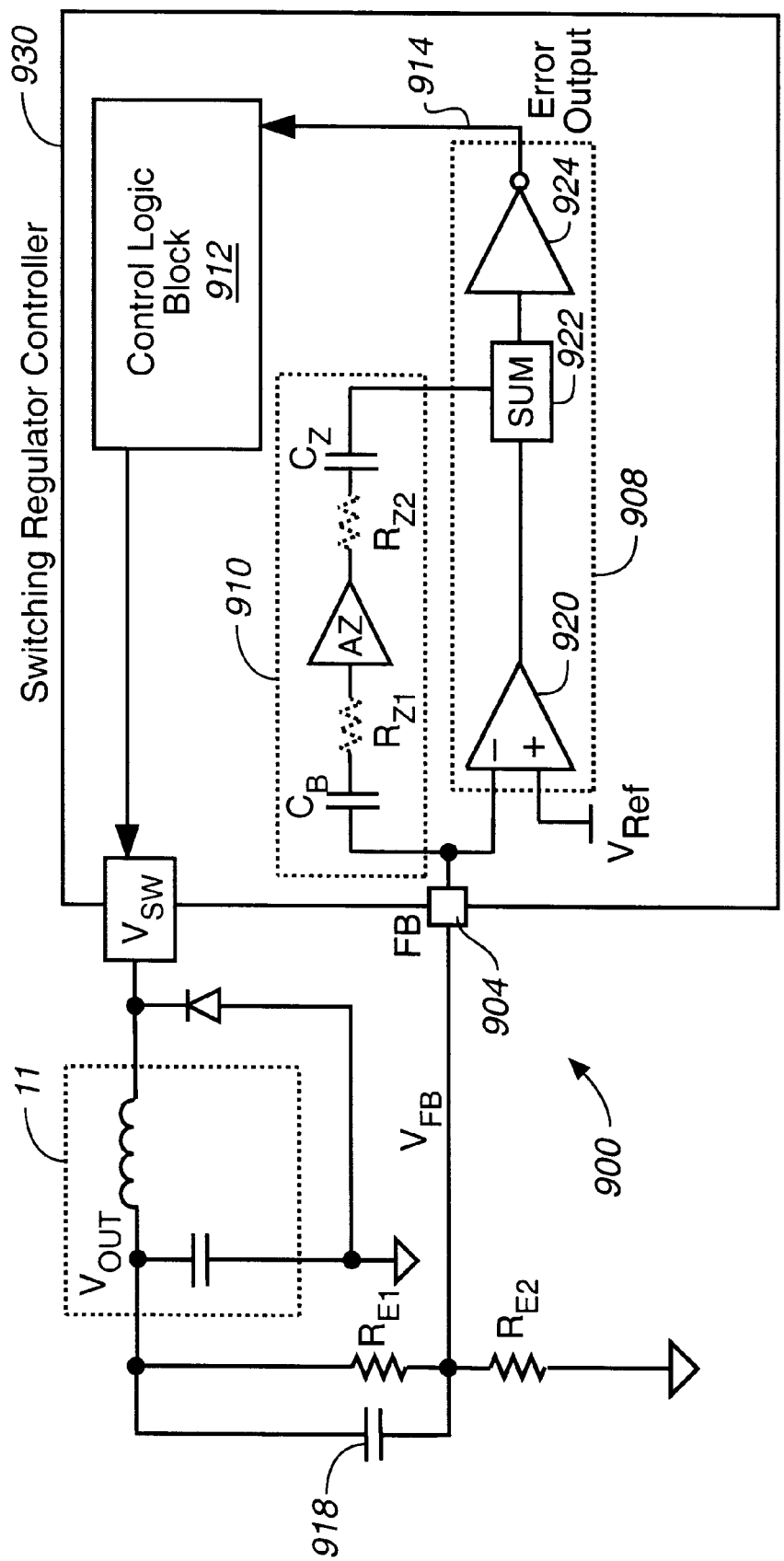
FIG. 9 is a schematic diagram of a switching regulator controller incorporating a zero generation circuit according to another embodiment of the present invention.

In the above-described embodiments, the zero generation circuit of the present invention generates a zero which is summed with the feedback voltage $V_{FB}$ at the input terminal of the error amplifier of the switching regulator controller. According to another aspect of the present invention, the summing node where the zero is introduced can be placed at other points in the feedback loop for providing effective zero compensation and improving frequency stability of the linear integrated circuit. Thus, other configurations for incorporating the zero generation circuit of the present invention in a switching regulator or other linear circuits are possible, as illustrated in FIGS. 7–9.

Figure 7A:
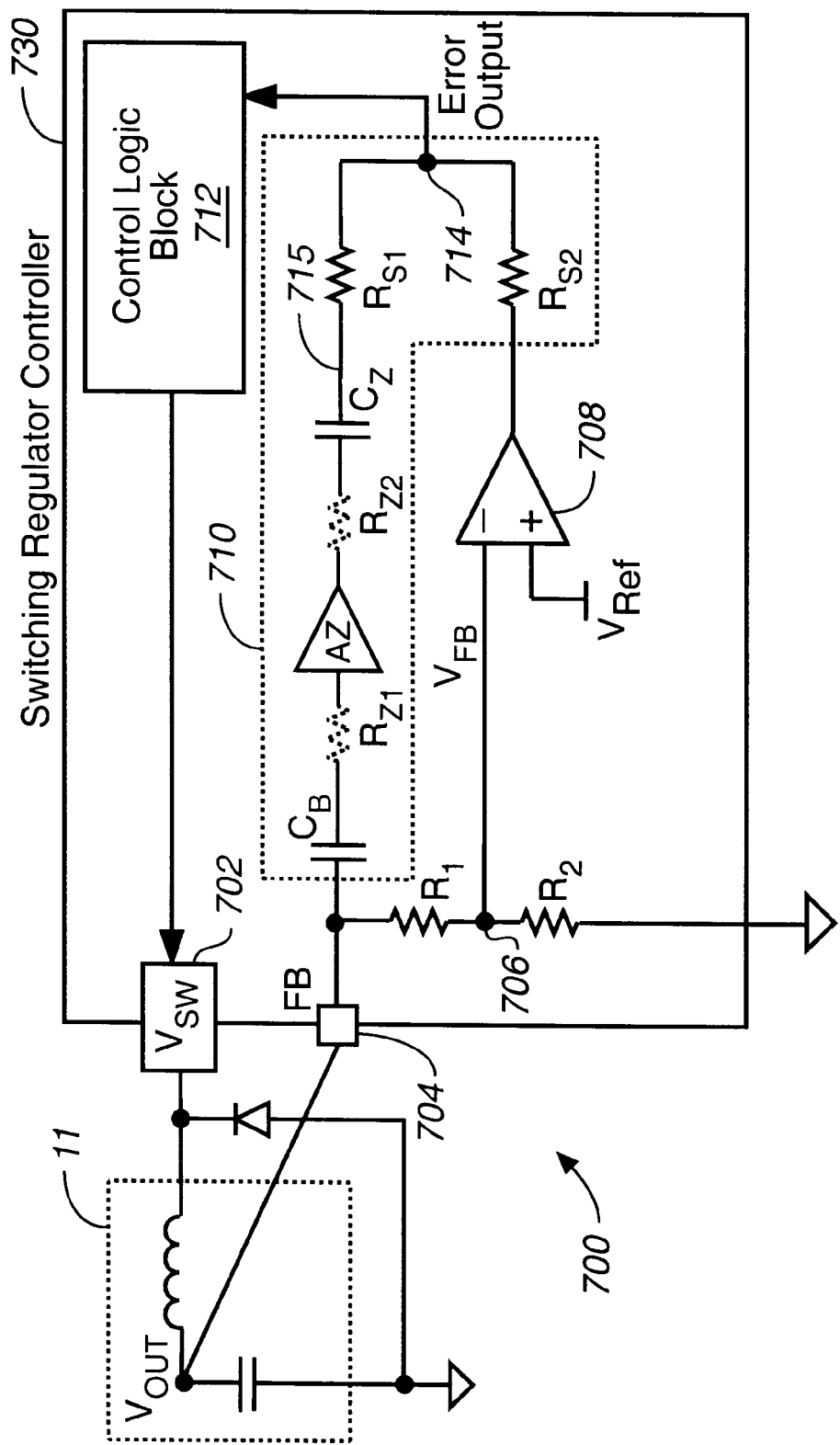
FIG. 7A is a schematic diagram of a switching regulator controller incorporating a zero generation circuit according to an alternate embodiment of the present invention.

FIG. 7A is a schematic diagram of a switching regulator controller incorporating a zero generation circuit according to an alternate embodiment of the present invention. In switching regulator 700 of FIG. 7A, the summing node where the zero is introduced is placed at the output node of error amplifier 708. Thus, zero generation circuit 710 generates a zero which is summed with the output signal at the output terminal of error amplifier 708 to generate the error output signal at node 714. The configuration shown in FIG. 7A has the advantage of providing a zero in the feedback loop while bypassing the error amplifier circuit. In some applications, it may not be desirable to introduce the zero at the input terminal of the error amplifier as the gain of the amplifier AZ in the zero generation circuit may be so large that the input signal to the error amplifier becomes saturated. In those cases, the configuration shown in FIG. 7A is preferable as the error amplifier is bypassed and the zero is introduced at the output terminal of the error amplifier instead.

Referring to FIG. 7A, zero generation circuit 710 is incorporated in switching regulator controller 730 for a fixed switching regulator 700. Thus, controller 730 includes an internal voltage divider implemented as resistors $R_1$ and $R_2$ in FIG. 7A. The output voltage of the voltage divider (node 706) is the feedback voltage $V_{FB}$ which is coupled to the inverting input terminal of error amplifier 708 to form the feedback loop for regulating the output voltage $V_{SW}$ at node 702. The regulated output voltage $V_{SW}$ is coupled to an LC filter 11 to generate an output voltage $V_{OUT}$ having substantially constant magnitude. The output voltage $V_{OUT}$ is fed back to controller 730 on a feedback terminal 704 to form the closed loop feedback system.

In the present embodiment, zero generation circuit 710 is coupled between feedback terminal 704 and a node 715. Node 715 is coupled to a summing circuit including resistors $R_{S1}$ and $R_{S2}$ providing a summed signal at node 714 (also referred to as the summing node). The zero generated by zero generation circuit 710 is summed with the output signal from error amplifier 708 through resistors $R_{S1}$ and $R_{S2}$ to affect the error output signal. In this manner, zero generation circuit 710 generates an effective zero for compensating the double-pole of the LC filter circuit in the feedback system of fixed switching regulator 700.

Zero generation circuit 710 can be implemented in the same manner as circuits 310 and 610 described previously. A capacitor $C_B$, coupled to the feedback terminal 704, is used to block out the DC components of the output voltage $V_{OUT}$ fed back to controller 730 at feedback terminal 704. An amplifier AZ, coupled to capacitor $C_B$, amplifies the AC components of the feedback voltage and couples the amplified voltage signal to a zero capacitor $C_Z$. Amplifier AZ can be implemented as shown in FIG. 5. The zero generated by zero capacitor $C_Z$ is converted to a voltage value by resistor $R_{S1}$. On the other hand, the output signal of error amplifier 708 is converted to a voltage value by resistor $R_{S2}$. The zero signal and the error amplifier output signal are summed at summing node 714 to generate the error output signal. The error output signal is coupled to control logic block 712 for regulating the regulated output voltage $V_{SW}$ on node 702.

In zero generation circuit 710, the resistance values of resistors $R_{S1}$ and $R_{S2}$ can vary from a very small value, such as near zero, to a very large value. Typically, a resistance value of 200 k ohms for resistor $R_{S1}$ and a resistance value of 200 k ohms for resistor $R_{S2}$ can be used. The ratio of the resistance of resistors $R_{S1}$ to $R_{S2}$ can also vary from near zero to a very large value. Typically, a $R_{S1}/R_{S2}$ resistance ratio of 1 can be used.

In the embodiment shown in FIG. 7A, the zero generation circuit generates a zero signal having wide range of applicability and is effective for compensating the double-pole of the LC filter circuit in the feedback system. Furthermore, the zero generation circuit retains all of the benefits of the zero generation circuits in the previous embodiments, while providing additional benefits not realized in the previous embodiments. Because the zero signal of the zero generation circuit does not propagate through the error amplifier of the switching regulator controller, significant performance enhancements can be achieved such as preventing saturation of the error amplifier input.

Figure 7B:
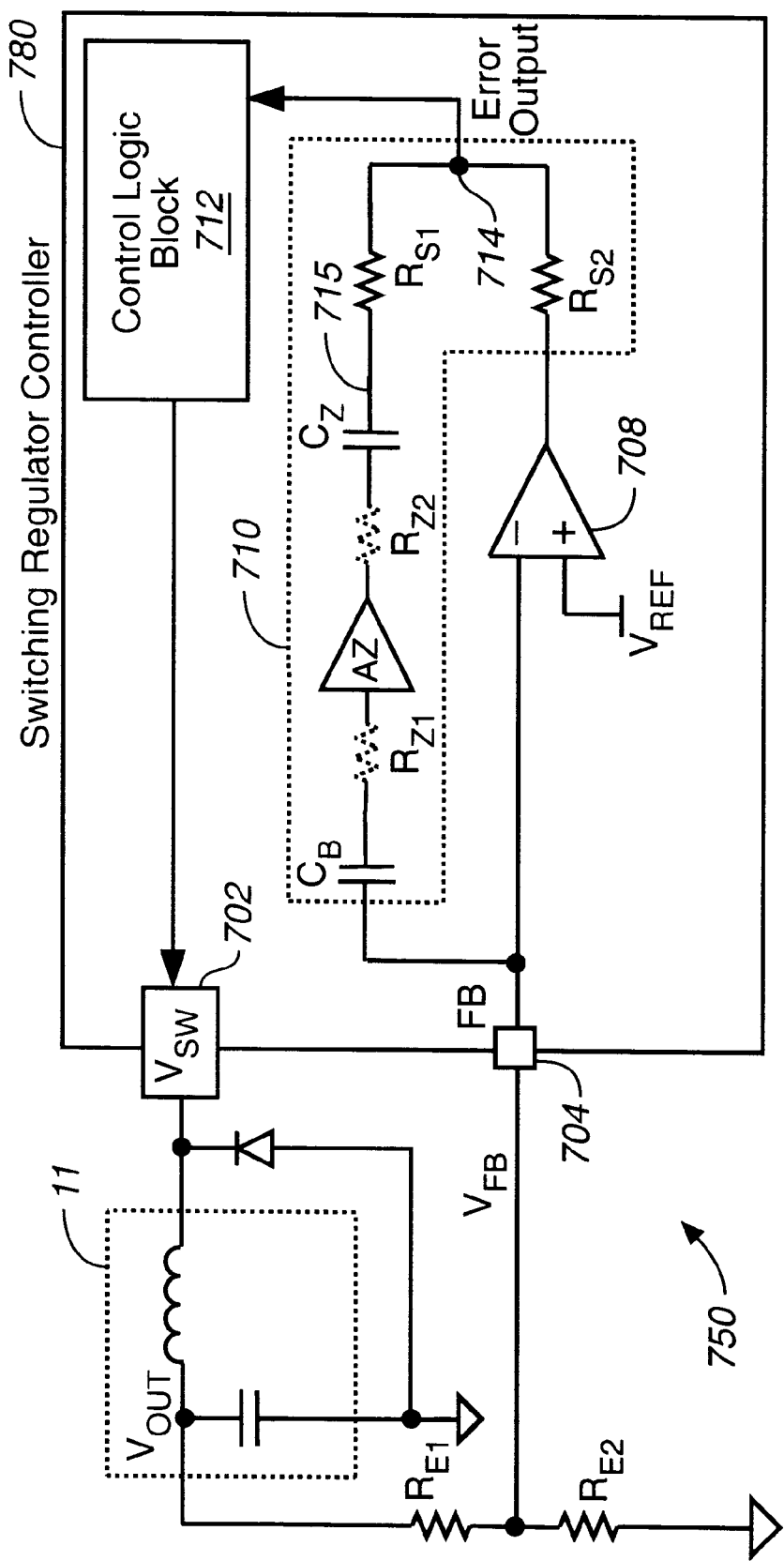
FIG. 7B is a schematic diagram of a switching regulator controller incorporating a zero generation circuit according to another embodiment of the present invention.

FIG. 7B illustrates the application of the configuration of FIG. 7A to an adjustable switching regulator utilizing an external voltage divider according to another embodiment of the present invention. Like elements in FIGS. 7A and 7B are given the same reference numerals to simplify the discussion. In adjustable switching regulator 750, zero generation circuit 710 is coupled between the feedback terminal 704 receiving the feedback voltage $V_{FB}$ and a node 715 coupled to a summing circuit. Feedback voltage $V_{FB}$ is the divided voltage of output voltage $V_{OUT}$ and is generated by an external voltage divider circuit including resistors $R_{E1}$ and $R_{E2}$. As described above, the summing circuit includes resistors $R_{S1}$ and $R_{S2}$ and is coupled to sum the zero signal generated at node 715 and the error output voltage generated by error amplifier 708. The operation of zero generation circuit 710 in switching regulator controller 780 is the same as in switching regulator controller 730 of FIG. 7A. The placement of the voltage divider external to switching regulator controller 780 has no impact on the operation of the zero generation circuit. Zero generation circuit 710 introduces a zero at the summing node which is summed with the error voltage from error amplifier 708. The zero introduced in the feedback loop of switching regulator 750 has a wide range of effectiveness.

FIG. 8 is a schematic diagram of a switching regulator controller incorporating a zero generation circuit according to a second alternate embodiment of the present invention. In switching regulator 800 of FIG. 8, error amplifier 808 is split into two gain stages (denoted by amplifiers 820 and 824) and the summing node where the zero is introduced is placed between the first gain stage and the second gain stage of the error amplifier. Thus, zero generation circuit 810 generates a zero which is summed with the output signal of the first gain stage and the resultant signal is further amplified by the second gain stage to generate the error output signal. The configuration shown in FIG. 8 provides numerous advantages, as will be described in more detail below.

Referring to FIG. 8, zero generation circuit 810 is incorporated in switching regulator controller 830 for a fixed switching regulator 800. Thus, resistors $R_1$ and $R_2$ represent the internal voltage divider for stepping down the output voltage $V_{OUT}$ received at feedback node 804. The output voltage of the voltage divider (node 806) is the feedback voltage $V_{FB}$ which is coupled to an inverting input terminal of error amplifier 808 to form the feedback loop for regulating the output voltage $V_{SW}$ at node 802. The regulated output voltage $V_{SW}$ is coupled to an LC filter 11 to generate an output voltage $V_{OUT}$ having substantially constant magnitude. The output voltage $V_{OUT}$ is fed back to controller 830 on feedback terminal 804 to form the closed loop feedback system.

As mentioned above, error amplifier 808 includes two gain stages, represented by amplifier 820 and inverting amplifier 824. One having ordinary skill in the relevant art would appreciate that the error amplifier in the switching regulator controller in this or other embodiments described herein can be either inverting or non-inverting depending on circuit design to provide the correct phase shift in the output signal. The exact polarity of the error amplifier is not critical to the principle of the present invention. Error amplifier 808 further includes a summing circuit 822 coupled between the output terminal of the first gate stage (amplifier 820) and the input terminal of the second gain stage (amplifier 824).

In the configuration shown in FIG. 8, zero generation circuit 810 is coupled between voltage divider output node 806 and a summing node in summing circuit 822 of error amplifier 808. Zero generation circuit 810 can be implemented in the same manner as described in the previous embodiments. Thus, zero generation circuit 810 includes a capacitor $C_B$, an amplifier AZ, and a zero capacitor $C_Z$, connected in series between node 806 and summing circuit 822. Zero generation circuit 810 operates in the same manner as described in the previous embodiments to generate a zero for the feedback loop of switching regulator 800.

In switching regulator controller 830, amplifier 820 of error amplifier 808 operates on the feedback voltage $V_{FB}$ received directly from the voltage divider circuit. At amplifier 820, feedback voltage $V_{FB}$ is compared with a reference voltage $V_{Ref}$ to generate an error signal denoted as $V_{EOUT1}$ at the output terminal of amplifier 820. The error signal $V_{EOUT1}$ is then summed with the zero generated by zero generation circuit 810 by summing circuit 822. The summed signal is provided to the second gain stage (amplifier 824) which amplifies the summed signal. The output signal of amplifier 824 is the error output signal (node 814) of error amplifier 808. The error output signal is coupled to control logic block 812 for regulating the regulated output voltage $V_{SW}$ on node 802. In this manner, zero generation circuit 810 generates an effective zero for compensating the double-pole of the LC filter circuit in the feedback system of fixed switching regulator 800.

In the present embodiment, the zero generated by the zero generation circuit 810 bypasses the first gain stage of error amplifier 808 and is coupled to summing circuit 822 in the error amplifier. The zero signal, summed with the error voltage $V_{EOUT1}$, is further amplified by the second gain stage to generate the error output signal of error amplifier 808. The configuration of zero generation circuit 810 in FIG. 8 provides several advantages. First, the configuration of FIG. 8 allows a zero with very high gain to be generated while avoiding the problem of saturating the front end of the error amplifier. As mentioned above, in the embodiments where the zero is introduced at the input terminal of the error amplifier, the gain of the zero signal has to be carefully controlled so as not to saturate the input signal to the error amplifier. On the other hand, the configuration of FIG. 8 is not subject to such limitation since the zero is not introduced at the input terminal of the error amplifier.

Second, by summing the zero and the error voltage $V_{EOUT1}$ prior to a second gain stage, the configuration in FIG. 8 is capable of providing a zero with very large gain as the summed signal is further amplified by the subsequent second gain stage. In the configuration of FIG. 7A, the zero is summed with the error output signal at node 714. Because there is no further amplification of the zero subsequent to the summing operation, the zero may not have a large enough gain. On the other hand, the configuration of FIG. 8 provides a zero with a very large gain since the zero is subjected to another gain stage after the summing operation. As will be explained in more detail below, amplifier 820 is designed to give the output voltage VEOUT1 an appropriate gain so that the summed signal of summing circuit 822 does not saturate the input of amplifier 824.

Third, in FIG. 8, the zero generation circuit relies on the second gain stage of the error amplifier to provide additional gain. Therefore, the zero generation circuit does not rely on resistor R1 to provide the resistive load, and thus additional gain, as is the case in the previous embodiments. As a result, the configuration in FIG. 8 couples the zero generation circuit directly to the feedback voltage node of the controller circuit. The configuration shown in FIG. 8 is more flexible and can be readily incorporated in a wide variety of linear integrated circuits. For instance, while FIG. 8 illustrates incorporating zero generation circuit 810 in a fixed switching regulator including an internal resistor structure, the same configuration can be applied to an adjustable switching regulator including an external resistor structure, as shown in FIG. 9.

FIG. 9 illustrates another embodiment of the present invention where the zero generation circuit is applied in an adjustable switching regulator 900 including an external voltage divider. In switching regulator 900, zero generation circuit 910 is coupled between the feedback terminal 904 receiving the feedback voltage $V_{FB}$ and a summing node in a summing circuit 922 in error amplifier 908. The operation of zero generation circuit 910 is the same as zero generation circuit 810 of FIG. 8. The placement of the voltage divider including resistors $R_{E1}$ and $R_{E2}$ external to switching regulator controller 930 has no impact on the operation of the zero generation circuit. Zero generation circuit 910 introduces a zero at the summing node which is summed with the error voltage from amplifier 920. The zero introduced in the feedback loop of switching regulator 900 has a wide range of effectiveness. Furthermore, because zero generation circuit 910 does not require an internal resistor to provide resistive load to increase gain, the zero generation circuit can be readily incorporated in adjustable switching regulator 900 without the need to include an internal resistor, as is the case in the configuration of FIG. 6.

Figure 10:
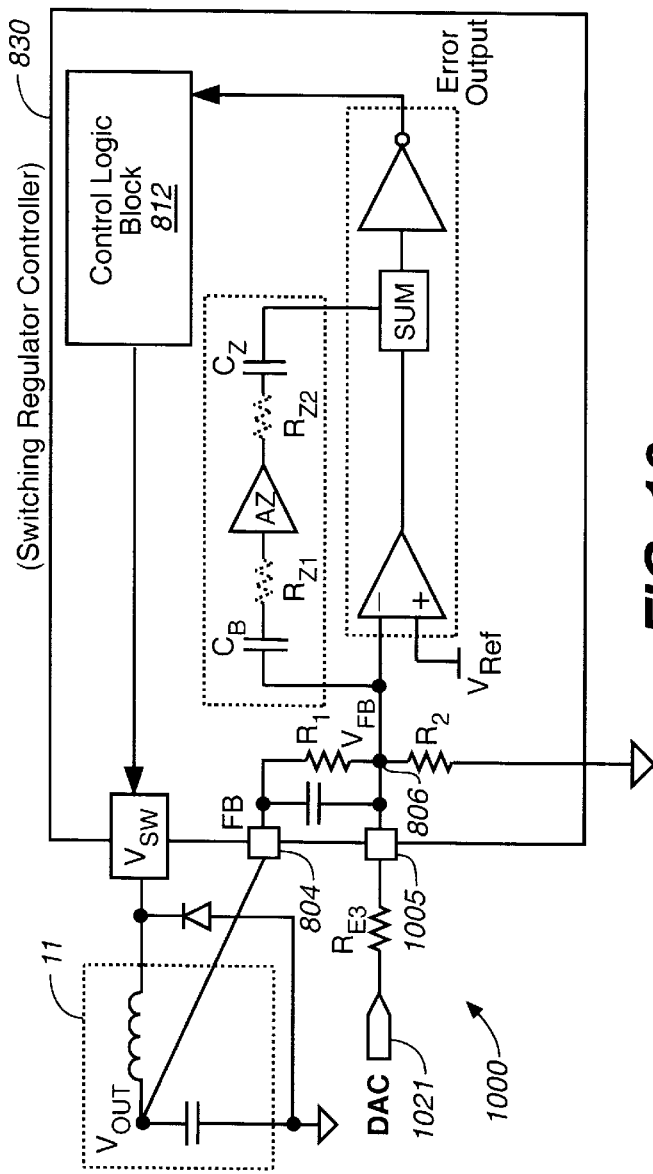
FIG. 10 is a schematic diagram illustrating an application of the switching regulator of FIG. 8 according to one embodiment of the present invention.

The configuration of zero generation circuit in FIG. 8 is also suitable for other circuit applications. FIG. 10 is a schematic diagram illustrating an application of the switching regulator of FIG. 8 according to one embodiment of the present invention. In FIG. 10, switching regulator controller 830 includes an additional input terminal 1005 which is coupled to the feedback voltage $V_{FB}$ (node 806). Input terminal 1005 is coupled to receive an input signal from a digital-to-analog converter (DAC) on terminal 1021 through a resistor $R_{E3}$. The configuration in FIG. 10 allows a DAC signal to be applied to the feedback voltage $V_{FB}$. When thus configured, switching regulator 1000 becomes a switching regulator with a computer controlled output voltage. Input terminal 1005 allows a computer to send a signal to the switching regulator controller for setting or changing the desired output voltage $V_{OUT}$.

In sum, by placing the summing node where the zero is introduced at a point in the feedback loop where the zero is further amplified, the zero generation circuit can be coupled directly to the feedback voltage node of a circuit, thus allowing the zero generation circuit to be readily applied in any linear integrated circuits. When applied in a switching regulator, the zero generation circuit can be implemented in switching regulators using any voltage divider circuit structure, including internal or external voltage divider circuits. The present configuration simplifies design complexity and provides implementation flexibility.

Returning to FIG. 8, switching regulator controller 830 includes a compensation capacitor 818 coupled in parallel to resistor R1 between the feedback terminal 804 and the feedback voltage node 806. Capacitor 818 is included to provide a minor pole cancellation for canceling a pole in the second gain stage (amplifier 824) of error amplifier 808. Capacitor 818 is optional and other methods for compensating for the minor pole in amplifier 824 may be used. In the case of an adjustable switching regulator, such as switching regulator 900 with an external resistor structure, the minor pole cancellation can be provided using an external capacitor 918 coupled across external resistor $R_{E1}$, as shown in FIG. 9. Again, capacitor 918 is optional and other means for pole cancellation can be used to compensate for the minor pole in amplifier 924.

Figure 11A:
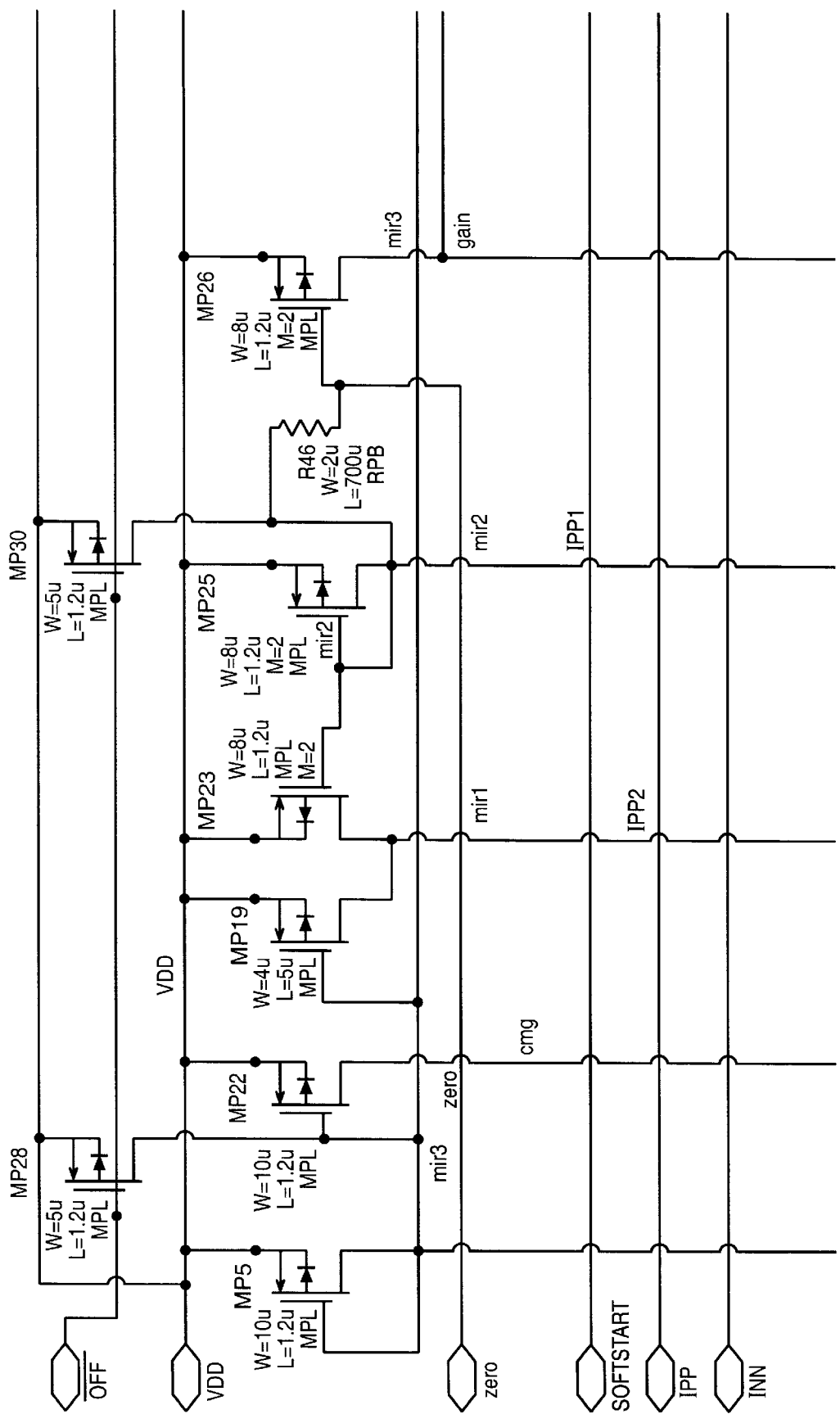
FIG. 11 is a circuit diagram of an error amplifier circuit which can be used to implement the error amplifiers in FIGS. 8 and 9 according to one embodiment of the present invention.
Figure 11C:
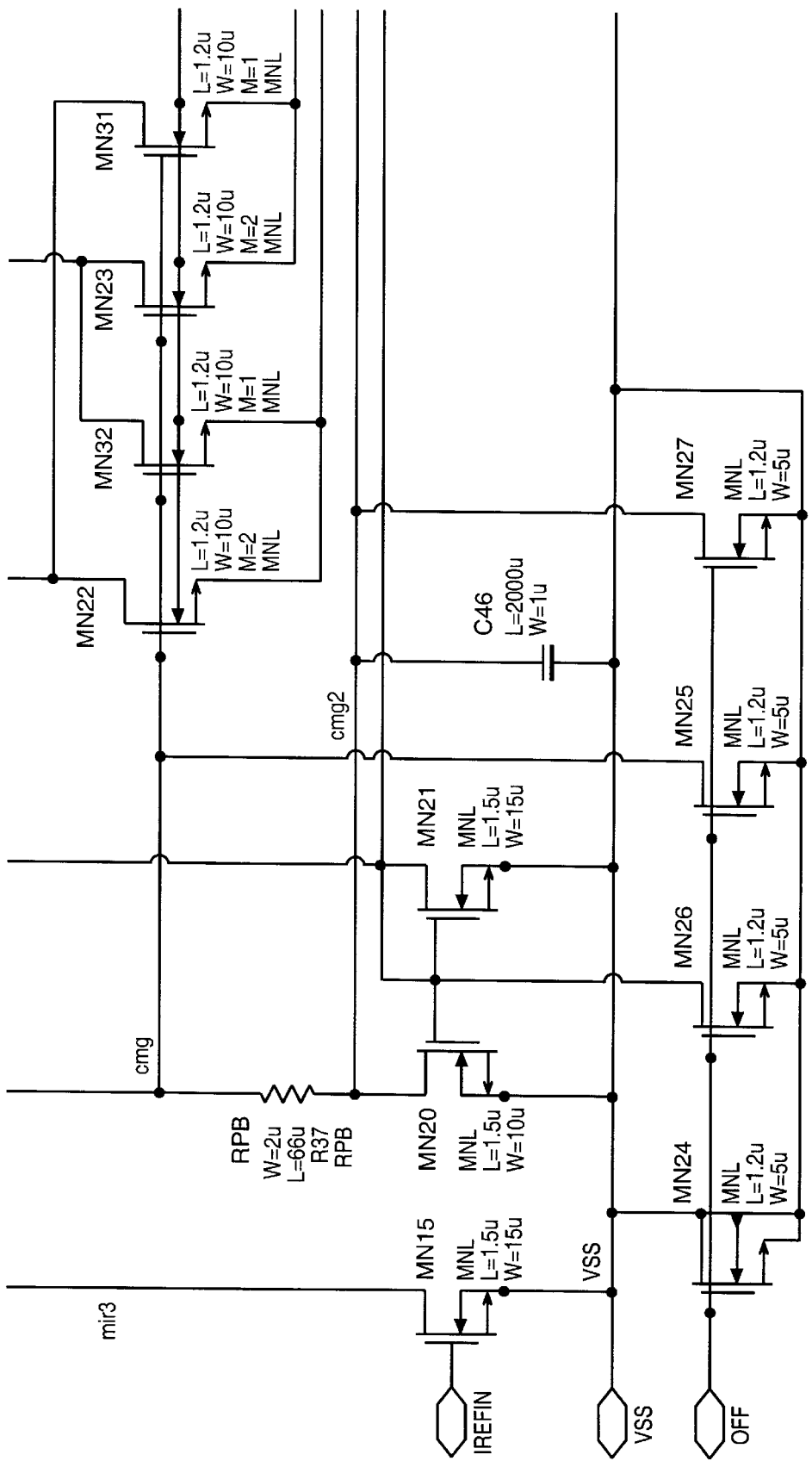
Figure 11D:
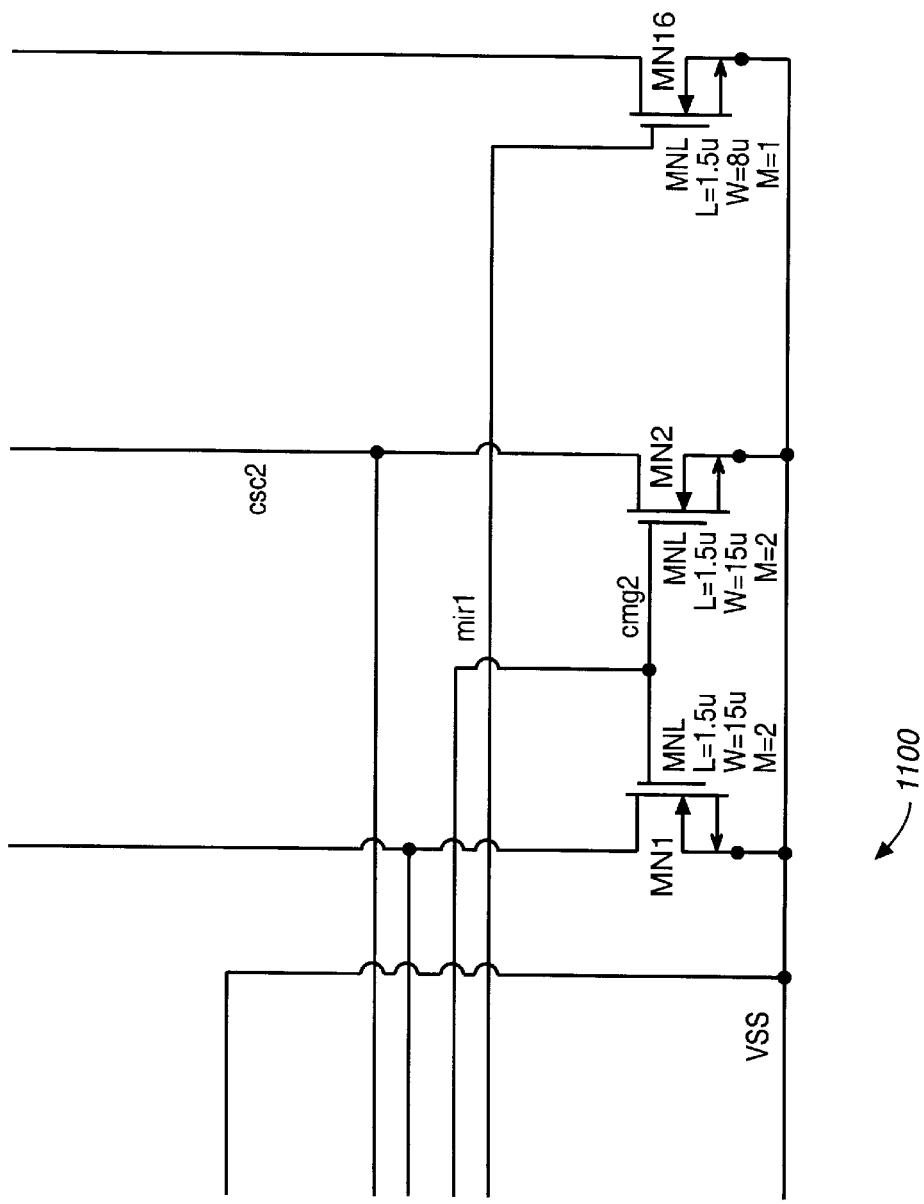

Error amplifiers 808 and 908 in FIGS. 8 and 9 can be implemented as any conventional two-stage error amplifiers including summing circuit 822. FIG. 11 illustrates an error amplifier circuit which can be used to implement error amplifiers 808 and 908 of FIGS. 8 and 9 according to one embodiment of the present invention. Error amplifier circuit 1100 is implemented using a 1.2 μm CMOS fabrication process. In FIG. 11, the notation "MN" preceding a reference number denotes an NMOS transistor while the notation "MP" preceding a reference number denotes a PMOS transistor. Referring to FIG. 11, error amplifier 1100 is a two-stage amplifier with a cascode amplifier as the first gain stage. The input terminal INN is the inverting input terminal for receiving the feedback voltage $V_{FB}$. The input terminals SOFTSTART and IPP provides the reference voltage $V_{Ref}$ for the error amplifier. Input signal SOFTSTART is a parallel reference signal to the IPP signal and is used at start-up of error amplifier circuit 1100 to ensure that the regulated output voltage $V_{SW}$ of the switching regulator is turned on slowly at start-up. Because the output terminal of the switching regulator controller is coupled to an LC filter circuit to provide a substantially constant regulator output voltage, voltage overshoot may result if the output voltage at the output terminal of the controller changes rapidly at circuit start-up. The SOFTSTART signal is provided to turn on the output voltage $V_{SW}$ slowing to avoid such a voltage overshoot condition.

Transistors MP1 and MP2 implements an analog OR function with input signals SOFTSTART and IPP. Transistors MP1 and MP2, together with transistor MP3 receiving the INN signal, form a comparator comparing the input signal at input terminal INN with the reference voltage provided at input terminal IPP. Transistors MN1 and MN2 provides the biasing current for the comparator. The output signals of the comparator (signals csc1 and csc2) are coupled to transistors MN22, MN23, MN31 and MN32. Transistors MN22, MN23, MN31 and MN32, together with transistors MP25 and MP26 form the cascode amplifier for the first gain stage. Transistors MN22, MN23, MN31 and MN32 are cross-coupled to reduce the gain of the first stage so as not to saturate the input to the second gain stage.

Transistors MP25 and MP26 forms a differential to single-end converter of the first gain stage. A resistor R46, coupled between the drain terminal of transistor MP25 and the gate terminal of transistor MP26, functions as the summing circuit in error amplifier circuit 1100. The zero generated by the zero generation circuit (denoted "zero" in FIG. 11) is coupled to one terminal of resistor R46 where the zero is summed with the error output voltage $V_{EOUT1}$ of the first gain stage. Transistor MP26 generates the summed signal, denoted as "gain" in FIG. 11, on its drain terminal and the gain signal is coupled to the second gain stage of error amplifier circuit 1100.

The gain signal generated by transistor MP26 is coupled to the gate terminal of transistor MP17 forming the second gain stage of error amplifier circuit 1100. A resistor-capacitor (RC) network HS6 is coupled between the gate and drain terminal of transistor MP17. The RC network includes a resistor R and a capacitor C providing the pole and zero of the error amplifier, respectively. The output terminal denoted by "out" in FIG. 11 is the error output of error amplifier circuit 1100. In the present embodiment, resistor R of the RC network is a diffused capacitor and capacitor C of the RC network is a MOS capacitor.

Error amplifier circuit 1100 may include other supporting circuitry to facilitate the operation of the error amplifier. For example, error amplifier circuit 1100 includes transistors MN24, MN25, MN26 and MN27 controlled by an "OFF" signal operating to turn off the error amplifier circuit. A complementary set of transistors, transistors MP28, MP30, MP31, and MP32, controlled by the complement "OFF" signal, is also provided. Transistors MN15, MN20 and MN21 form current mirrors for providing bias current to the error amplifier circuit. In the embodiment shown in FIG. 11, error amplifier circuit 1100 includes a reset transistor MP34 controlled by an active-high "reset" signal. Reset transistor MP34 operates to pull the output node "out" to a threshold voltage below the Vdd voltage when the circuit is turned on. In this manner, the output node is properly biased for efficient circuit operation.

In the implementation shown in FIG. 11, error amplifier circuit 110 also includes an optional layout feature to provide an offset voltage at transistor MP3. In the comparator circuit including transistors MP1, MP2 and MP3, transistor MP2 receiving the SOFTSTART signal is only one half the size of transistor MP1. The sizing of transistor MP2 creates an offset voltage such that transistor MP3 is turned on slightly when the SOFTSTART is at 0 volt and the error amplifier circuit is turned on. Keeping transistor MP3 slightly on has the advantage of ensuing proper start-up of error amplifier circuit 1100 where the error amplifier is turned on subsequently by assertion of the SOFTSTART signal.

As is well known in the art, circuit layout rules and techniques can be applied in the implementation of error amplifier 1100 to achieve optimal circuit operation. In the present embodiment, selected groups of transistors in error amplifier 110 are "matched" during circuit layout in order to minimize the offset of the error amplifier. The "transistor matching" layout technique is well known in the art and typically involves interdigitating the transistors to be matched. For example, to match a transistor A and a transistor B, each having a width of 40 $\mu$m, each of the two transistors is drawn as two transistor portions of 20 $\mu$m each in width. The four transistor portions of transistors A and B can be layout out in an "ABBA" configuration where the transistor portions of transistor A bonds the transistor portions of transistor B. Of course, the "ABBA" configuration is exemplary only and other techniques for transistor matching may be used. Referring to FIG. 11, transistors MP25 and MP26 in error amplifier circuit 1100 are matched; transistors MP1 and MP3 are matched; transistors MN1 and MN2 are matched; and finally, transistors MN22, MN23, MN31, MN32 are also matched.

Figure 12A:
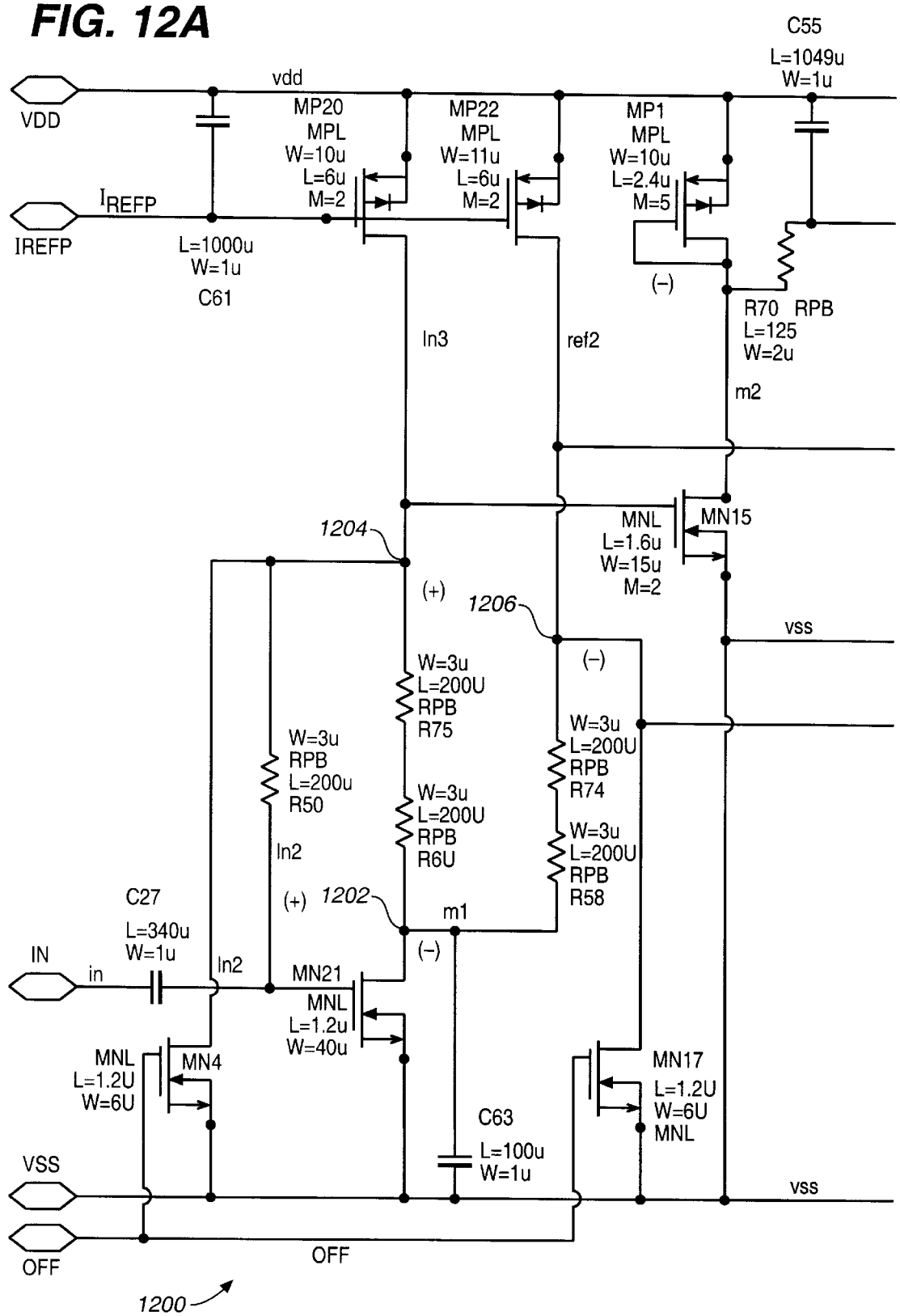
FIG. 12 is a circuit diagram illustrating a zero generation circuit according to one embodiment of the present invention.
Figures 12, 12B:
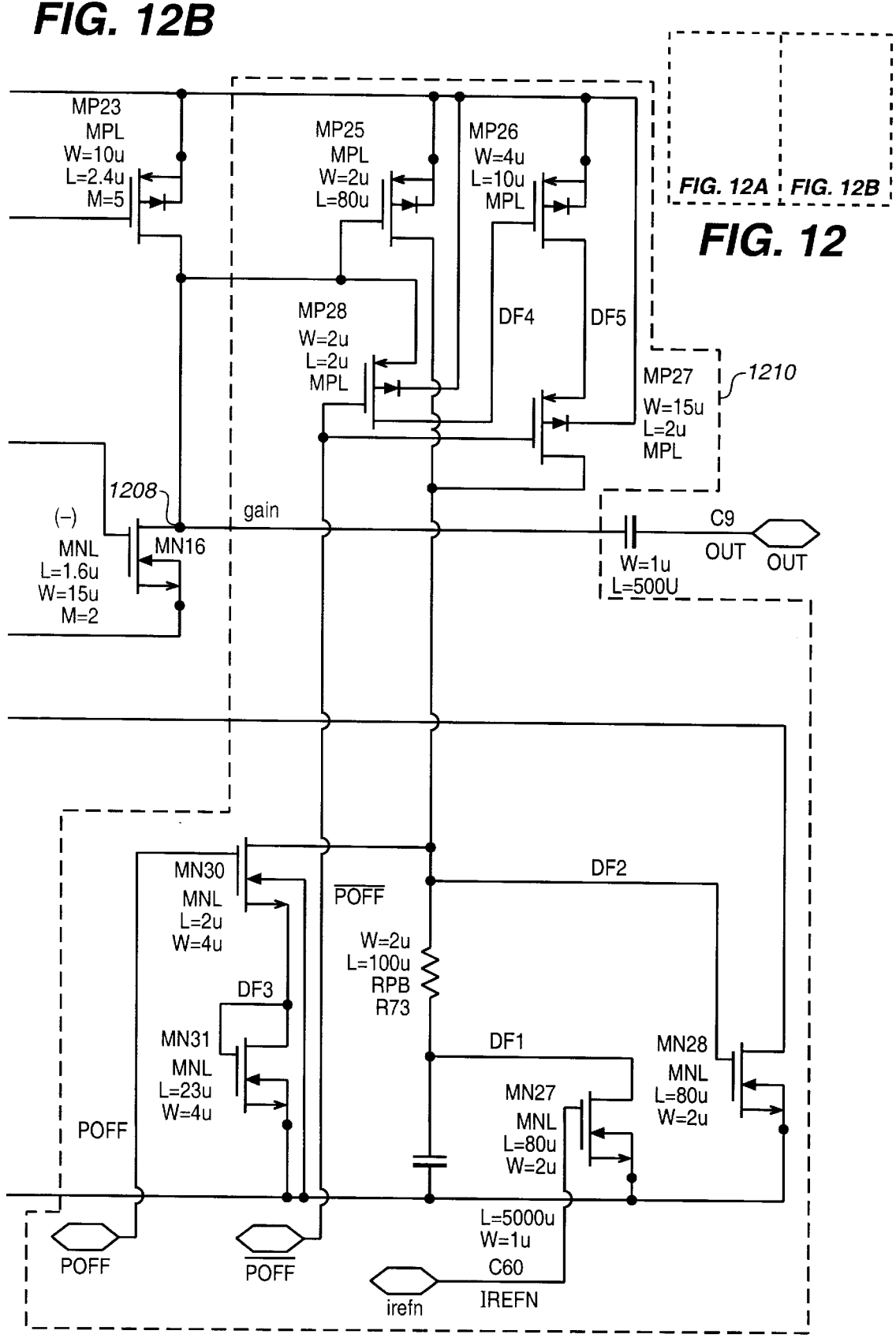

Returning to FIGS. 7–10, amplifier AZ of the zero generation circuit in each of FIGS. 7–10 is an open loop amplifier and can be implemented as any conventional gain stages known in the art. In one embodiment, the zero generation circuits of FIGS. 7–10 are implemented as shown in FIG. 5. FIG. 12 is a circuit diagram illustrating a zero generation circuit according to another embodiment of the present invention. FIG. 12 illustrates another implementation of amplifier AZ which can be applied in the zero generation circuit of the present invention to enhance the performance of the zero generation circuit.

In the present embodiment, zero generation circuit is fabricated using a 1.2 $\mu$m CMOS process. Similar to FIG. 11, the notation "MP" denotes a PMOS transistor and the notation "MN" denotes an NMOS transistor. Referring to FIG. 12, zero generation circuit 1200 includes a capacitor C27 functioning as the blocking capacitor $C_B$ and a capacitor C9 functioning as the zero capacitor $C_Z$. The amplifier AZ of zero generation circuit 1200 includes a single-end to differential converter stage, a differential amplifier stage and a differential to single-ended converter stage.

The single-ended to differential converter stage includes a transistor MN21 and a resistor network R58, R68, R74 and R75. The single-to-differential converter stage converts the input signal "IN" to a positive (+) and a negative (−) differential signals at nodes 1204 and 1206, respectively. The feedback path formed by resistor R50 between node 1204 and the gate terminal of transistor MN21 keeps the positive signal (node 1204) at a nearly constant voltage, thus allowing the negative signal (node 1206) to reacts strongly to any changes at the drain terminal (node 1202) of transistor MN21. Thus, a slight change in voltage at node 1202 will cause only a small change in voltage at the positive signal (node 1204) but a large change in voltage at the negative signal (node 1206).

The differential output signals from the single-ended to differential converter stage are coupled to a differential amplifier formed by transistors MN15 and MN16. The use of a differential amplifier has advantages over the single transistor amplifier implementation of FIG. 5 in that the differential amplifier operates at a faster speed and also rejects spurious substrate noise. In FIG. 12, capacitor C55 and resistor R70 are added to the differential amplifier for stabilization.

Finally, the differential output signal from the differential amplifier is converted back to a single-ended output signal by the operation of transistor MP23. The single-ended output "gain" (node 1208) is the amplified AC component of the input signal "in" and is coupled to capacitor C9 to generate a zero at the output terminal "OUT," as shown in FIG. 12.

Zero generation circuit 1200 may include other supporting circuitry to facilitate the operation of the amplifier circuit. For example, zero generation circuit 1200 includes a current mirror formed by transistors MP20 and MP22 to provide a reference current to the resistor network. In the present embodiment, zero generation circuit 1200 further includes a bias feedback circuit 1210 demarcated by the dotted line in FIG. 12. Bias feedback circuit 1210 operates to hold the "gain" node (node 1208) at a voltage level that will provide the peak gain for the zero generation circuit. Specifically, bias feedback circuit 1210 operates through transistor MP25 to hold the gain node (node 1208) at a voltage level one threshold below the Vdd voltage. Capacitor C60 is provided to ensure that the operation of bias feedback circuit 1210 is very slow compared to the amplifier circuit in zero generation circuit 1210 so that the bias feedback circuit does not affect the operation of the zero generation circuit.

Bias feedback circuit 1210 receives as input signals a "POFF" signal and its complement. The POFF signal is provided to cause bias feedback circuit 1210 to either operate in a "fast" mode or a "slow" mode. When the POFF signal is asserted, bias feedback circuit 1210 operates in a fast mode to get amplifier AZ in the zero generation circuit into equilibrium very quickly. Then the POFF signal is deasserted to allow the bias feedback circuit to operate in the slow mode for regulating the voltage at the gain node (node 1208).

Figure 13:
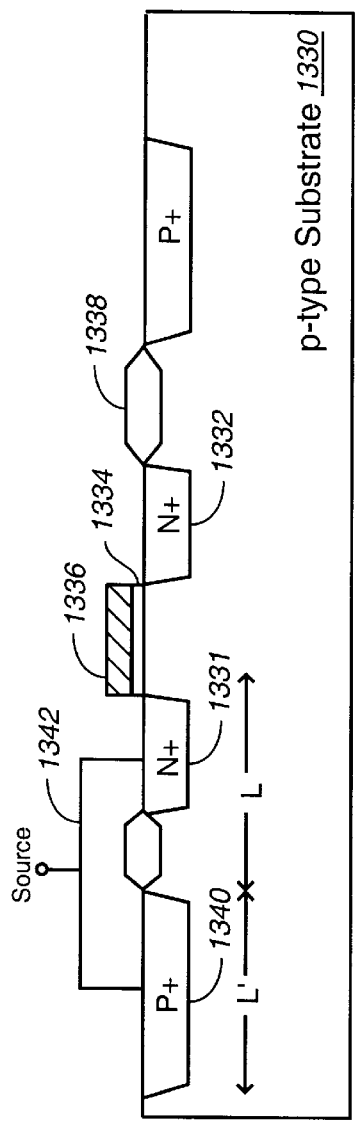
FIG. 13 illustrates an exemplary guard-ring structure which can be used in zero generation circuit of FIG. 12 according to one embodiment of the present invention.

In the present embodiment, transistors MN15 and MN16, MN21, MN27, MN28 and MN31 are fabricated using extra guard-ring protection. The extra guard-ring protection is provided to shield the sensitive transistors from spurious substrate current which may affect the operational accuracy of the circuit. Of course, any conventional guard-ring structure may be used. FIG. 13 illustrates an exemplary guard-ring structure which can be used in zero generation circuit 1200 according to one embodiment of the present invention. FIG. 13 is a cross-sectional view of a single NMOS transistor including a N+ source terminal 1331, a N+ drain terminal 1332 and a gate terminal 1336 separated from a p-type substrate 1330 by a thin gate oxide layer 1334. A guard-ring structure 1340 consisting of a ring of p+ diffusion region surrounds the NMOS transistor. The length L' of guard-ring structure 1340 is at least equal to the distance L representing the distance to be guarded. The distance L is generally the distance from the channel of the transistor to the edge of the guard-ring. Guard-ring structure 1340 operates to absorb stray current in substrate 1330 to prevent the stray current from reaching the channel region and affecting the operation of the NMOS transistor. The use of extra guard-ring protection in zero generation circuit 1210 is optional. Furthermore, the guard-ring structure shown in FIG. 13 is illustrative only and other guard-ring structures may be used to shield the sensitive transistors in the amplifier AZ circuit from undesirable substrate current.

While the amplifier circuit of FIG. 5 or any conventional amplifier circuit can be used to implement the amplifier in the zero generation circuit of the present invention, the use of zero generation circuit 1200 of FIG. 12 provides several advantages. First, the use of a differential amplifier in amplifier AZ in FIG. 12 helps to eliminate substrate noise. When extra guard-ring protection is also provided, the effect of substrate noise can be substantially eliminated and the amplifier AZ can operate at a much higher degree of accuracy. Second, the inclusion of bias feedback circuit 1210 ensures that zero generation circuit 1200 can obtain maximum gain, despite process variations. In the circuit of FIG. 5, amplifier AZ relies on the ratio of the output impedance of NMOS transistor 508 to the PMOS transistor 504 to provide the proper bias for maximum gain. However, small process variations can cause the ratio of the output impedance of the transistors to change, thus affecting the gain and resulting in low manufacturing yield. On the other hand, the use of the bias feedback circuit in amplifier AZ enhances manufacturing robustness as the proper bias for the amplifier is no longer dependent upon manufacturing process variations. Thus, the use of zero generation circuit 1200 including bias feedback circuit 1210 can ensure maximum gain while improving manufacturing yield.

In one embodiment, the configuration of zero generation circuit shown in FIG. 8 is used to construct a high efficiency, high frequency synchronous step-down switching regulator (also known as a buck converter). A buck converter, constructed incorporating the zero generation circuit of the present invention, can operate at a frequency range of 500 kHz to 2 MHz while achieving 90% power conversion efficiency. Other applications of the zero generation circuit of the present invention will be apparent to those skilled in the art, upon being apprised of the present description.

The above detailed descriptions are provided to illustrate specific embodiments of the present invention and are not intended to be limiting. Numerous modifications and variations within the scope of the present invention are possible. For example, while the above descriptions describe incorporating the zero generating circuit of the present invention in a switching regulator controller, the zero generating circuit of the present invention can be incorporated in any linear circuits being operated in a closed loop feedback system to ensure frequency stability. Also, while the implementation of the zero generation circuit has been described using CMOS devices, the circuit can also be implemented using bipolar devices to provide the same frequency stabilizing result. Lastly, while in the present descriptions, the voltage divider of controller 330 includes two resistors $R_1$ and $R_2$, a person of ordinary skill in the art would appreciate that the voltage divider can be implemented using any numbers of resistors to produce the desired divided voltage. The present invention is defined by the appended claims.

I claim:

1. A compensation circuit for introducing a zero in a first circuit being incorporated in a closed loop feedback system, said first circuit including a first terminal generating a first voltage for said closed loop feedback system, a feedback terminal for receiving a second voltage from said closed loop feedback system, an input node in said first circuit receiving a feedback voltage corresponding to said second voltage, said input node being coupled to an error amplifier, said compensation circuit comprising:

a first capacitor coupled between said input node in said first circuit and a first node, said first capacitor blocking out the DC component of said feedback voltage;

an amplifier coupled between said first node and a second node; and a second capacitor coupled between said second node and a summing node in said error amplifier, said summing node coupled to a summing circuit disposed between a first gain stage and a second gain stage of said error amplifier in said first circuit.

2. The circuit of claim 1, wherein said amplifier amplifies a capacitance of said second capacitor for introducing a zero in said first circuit.

3. The circuit of claim 1, wherein said amplifier is an open loop amplifier.

4. The circuit of claim 1, wherein said amplifier comprises a single-ended to differential converter stage coupled to received an input signal at said first node and generating a differential output signal indicative of a difference between said input signal and a reference voltage, a differential amplifier coupled to received said differential output signal and generating a gain signal, and a differential to single-ended converter stage for amplifying said gain signal and generating an output signal at said second node.

5. The circuit of claim 4, wherein said amplifier further comprises a bias feedback circuit for setting a voltage level at said second node of said amplifier for achieving maximum gain for said amplifier circuit.

6. The circuit of claim 5, wherein said voltage level is a transistor threshold level below a power supply voltage.

7. The circuit of claim 1, wherein said amplifier comprises:
- a first resistor coupled between said first node and a third node;
- a first transistor having a control terminal coupled to said first node, a first current handling terminal coupled to said third node and a second current handling terminal coupled to a first power supply;
- a first current mirror having an input terminal coupled to receive a first bias voltage and an output terminal coupled to said third node and providing a first bias current to said first transistor;
- a second transistor having a control terminal coupled to said third node, a first current handling terminal coupled to said second node and a second current handling terminal coupled to said first power supply; and
- a second current mirror having an input terminal coupled to receive said first bias voltage and an output terminal coupled to said second node and providing a second bias current to said second transistor.

8. The circuit of claim 7, wherein said first and second transistors are NMOS transistors.

9. The circuit of claim 7, wherein each of said first and second current mirrors comprises a PMOS transistors having its gate terminal coupled to said first bias voltage, a first current handling terminal providing a bias current and a second current handling terminal coupled to a second power supply.

10. The circuit of claim 9, wherein said first power supply is ground and said second power supply is a positive power supply.

11. The circuit of claim 7, wherein said first resistor is a diffused resistor.

12. The circuit of claim 1, wherein each of said first and second capacitors comprises an MOS capacitor.

13. The circuit of claim 1, wherein said second capacitor has a capacitance of about 1 to 5 picofarads and said first capacitor has a capacitance of about one-fifth of said second capacitor.

14. The circuit of claim 1, wherein said first circuit further comprises a voltage divider coupled to said feedback terminal for dividing said second voltage and generating said feedback voltage at said input node, said voltage divider being manufactured on the same integrated circuit as said first circuit and said compensation circuit.

15. The circuit of claim 14, wherein said voltage divider comprises a first resistor and a second resistor connected in series, said first resistor being coupled between said feedback terminal and said input node and said second resistor being coupled between said input node and a first power supply.

16. The circuit of claim 15, wherein said first circuit further comprises a third capacitor connected in parallel with said first resistor, said third capacitor providing compensation for said error amplifier.

17. The circuit of claim 14, wherein said first circuit further comprises a second terminal coupled to said input node and a first resistor coupled to said second terminal, said first resistor receiving an input signal from a digital-to-analog converter (DAC) and coupling said input signal to said second terminal.

18. The circuit of claim 1, wherein said second voltage is a divided voltage of said first voltage generated by a voltage divider external to said first circuit, said second voltage being said feedback voltage.

19. A switching regulator controller circuit comprising:
- an output terminal providing a signal corresponding to a regulated output voltage;
- a feedback terminal for receiving a first voltage corresponding to said regulated output voltage;
- an error amplifier having a first input node coupled to receive a feedback voltage corresponding to said first voltage, a second input node coupled to a reference voltage and an error output node providing an error voltage indicative of the difference between said feedback voltage and said reference voltage, said error amplifier comprising a first gain stage, a summing circuit and a second gain stage, connected in series;
- a control circuit comprising an input node receiving said error voltage and an output node generating said signal corresponding to said regulated output voltage in response to said error voltage, said control circuit coupling said signal to said output terminal;
- a first capacitor coupled between said first input node of said error amplifier and a first node, said first capacitor for blocking out the DC component of said feedback voltage;
- an amplifier coupled between said first node and a second node; and
- a second capacitor coupled between said second node and a summing node coupled to said summing circuit in said error amplifier.

20. The circuit of claim 19, wherein said amplifier amplifies a capacitance of said second capacitor for introducing a zero in said switching regulator controller circuit.

21. The circuit of claim 19, wherein said amplifier is an open loop amplifier.

22. The circuit of claim 19, wherein said amplifier comprises a single-ended to differential converter stage coupled to received an input signal at said first node and generating a differential output signal indicative of a difference between said input signal and a reference voltage, a differential amplifier coupled to received said differential output signal and generating a gain signal, and a differential to single-ended converter stage for amplifying said gain signal and generating an output signal at said second node.

23. The circuit of claim 22, wherein said amplifier further comprises a bias feedback circuit for setting a voltage level at said second node of said amplifier for achieving maximum gain for said amplifier circuit.

24. The circuit of claim 23, wherein said voltage level is a transistor threshold level below a power supply voltage.

25. The circuit of claim 19, wherein said amplifier comprises:

a first resistor coupled between said first node and a third node;

a first transistor having a control terminal coupled to said first node, a first current handling terminal coupled to said third node and a second current handling terminal coupled to a first power supply;

a first current mirror having an input terminal coupled to receive a first bias voltage and an output terminal coupled to said third node and providing a first bias current to said first transistor;

a second transistor having a control terminal coupled to said third node, a first current handling terminal coupled to said second node and a second current handling terminal coupled to said first power supply; and a second current mirror having an input terminal coupled to receive said first bias voltage and an output terminal coupled to said second node and providing a second bias current to said second transistor.

26. The circuit of claim 25, wherein said first and second transistors are NMOS transistors.

27. The circuit of claim 25, wherein each of said first and second current mirrors comprises a PMOS transistors having its gate terminal coupled to said first bias voltage, a first current handling terminal providing a bias current and a second current handling terminal coupled to a second power supply.

28. The circuit of claim 27, wherein said first power supply is ground and said second power supply is a positive power supply.

29. The circuit of claim 25, wherein said first resistor is a diffused resistor.

30. The circuit of claim 19, wherein each of said first and second capacitors comprises an MOS capacitor.

31. The circuit of claim 19, wherein said second capacitor has a capacitance of about 1 to 5 picofarads and said first capacitor has a capacitance of about one-fifth of said second capacitor.

32. The circuit of claim 19, wherein said first voltage is said regulated output voltage and said switching regulator controller circuit further comprises a voltage divider coupled to said feedback terminal for dividing said first voltage and generating said feedback voltage at said first input node of said error amplifier.

33. The circuit of claim 32, wherein said voltage divider comprises a first resistor and a second resistor connected in series between said feedback terminal and a first power supply, said voltage divider providing said feedback voltage at an output node between said first and second resistors.

34. The circuit of claim 33, further comprising a third capacitor coupled between said feedback terminal and said first input node of said error amplifier, said third capacitor providing zero compensation for said error amplifier.

35. The circuit of claim 32, further comprising a second terminal coupled to said first input node of said error amplifier, said second terminal is coupled to a first resistor for receiving an input signal from a digital-to-analog converter (DAC).

36. The circuit of claim 19, wherein said first voltage is a divided voltage of said regulated output voltage generated by a voltage divider external to said switching regulator controller circuit, said feedback voltage being said first voltage.

37. The circuit of claim 36, wherein said voltage divider external to said switching regulator controller circuit comprises a first resistor and a second resistor connected in series, said first resistor being coupled between said regulator output voltage and said feedback terminal and said second resistor being coupled between said feedback terminal and a first power supply.

38. The circuit of claim 37, wherein said voltage divider external to said switching regulator controller circuit further comprises a third capacitor connected in parallel with said first resistor, said third capacitor providing zero compensation for said error amplifier.

39. The circuit of claim 19, wherein said output terminal of said switching regulator controller circuit is coupled to an output filter circuit for generating said regulated output voltage.

40. The circuit of claim 39, wherein said output filter circuit comprises an inductor and a capacitor connected in series between said output terminal and a ground terminal.

41. A method for providing zero compensation in a first circuit incorporated in a closed loop feedback system, said method comprising:

applying a feedback voltage at a first node of said first circuit to a first capacitor, said first voltage corresponding to a first voltage of said closed loop feedback system;

filtering out the DC component from said feedback voltage using said first capacitor;

amplifying said filtered feedback voltage;

applying said amplified filtered feedback voltage to a second capacitor coupled to a second node of said first circuit;

introducing a zero at said second node in said first circuit as a result of coupling said amplified filtered feedback voltage to said second node;

coupling said feedback voltage to an input node of a second circuit in said first circuit;

determining a difference voltage between said feedback voltage and a reference voltage at said second circuit;

summing at said second node said difference voltage and a voltage corresponding to said zero; and amplifying said summed signal.

42. The method of claim 41, wherein said applying said amplified filtered feedback voltage to a second capacitor functions to amplify the capacitance of said second capacitor for introducing a zero for canceling a pole in said closed loop feedback system.

43. The method of claim 41, wherein said second circuit is an error amplifier circuit.

44. The method of claim 43, wherein said determining a different voltage is performed in a first gain stage of said error amplifier circuit.

45. The method of claim 43, wherein said amplifying said summed signal is performed in a second gain stage of said error amplifier circuit.

46. A switching regulator controller circuit comprising:

an output terminal providing a signal corresponding to a regulated output voltage;

a feedback terminal for receiving a first voltage corresponding to said regulated output voltage;

an error amplifier having a first input node coupled to receive a feedback voltage corresponding to said first voltage, a second input node coupled to a reference voltage and an error output node providing an error voltage indicative of the difference between said feedback voltage and said reference voltage;

a first capacitor coupled between said first input node of said error amplifier and a first node, said first capacitor for blocking out the DC component of said first voltage;

an amplifier coupled between said first node and a second node;

a second capacitor coupled between said second node and a third node, said second capacitor introducing a zero at said third node;

a summing circuit coupled to said third node and said error output node for summing a voltage corresponding to said zero and said error voltage and generating a summed signal at a summing node; and a control circuit comprising an input node receiving said summed signal and an output node generating said signal corresponding to said regulated output voltage in response to said error voltage, said control circuit coupling said signal to said output terminal.

47. The circuit of claim 46, wherein said summing circuit comprises:

a first resistor coupled between said third node and said summing node; and a second resistor coupled between said error output node and said summing node.

48. The circuit of claim 47, wherein said first resistor has a resistance value of about 200 k ohms; and said second resistor has a resistance value of about 200 k ohms.

49. The circuit of claim 47, wherein a ratio of a resistance value of said first resistor to a resistance value of said second resistor is about 1.

50. The circuit of claim 46, wherein said amplifier amplifies a capacitance of said second capacitor for introducing a zero in said switching regulator controller circuit.

51. The circuit of claim 46, wherein said amplifier is an open loop amplifier.

52. The circuit of claim 46, wherein said amplifier comprises:

a first resistor coupled between said first node and a third node;

a first transistor having a control terminal coupled to said first node, a first current handling terminal coupled to said third node and a second current handling terminal coupled to a first power supply;

a first current mirror having an input terminal coupled to receive a first bias voltage and an output terminal coupled to said third node and providing a first bias current to said first transistor;

a second transistor having a control terminal coupled to said third node, a first current handling terminal coupled to said second node and a second current handling terminal coupled to said first power supply; and a second current mirror having an input terminal coupled to receive said first bias voltage and an output terminal coupled to said second node and providing a second bias current to said second transistor.

53. The circuit of claim 52, wherein said first and second transistors are NMOS transistors.

54. The circuit of claim 52, wherein each of said first and second current mirrors comprises a PMOS transistors having its gate terminal coupled to said first bias voltage, a first current handling terminal providing a bias current and a second current handling terminal coupled to a second power supply.

55. The circuit of claim 54, wherein said first power supply is ground and said second power supply is a positive power supply.

56. The circuit of claim 52, wherein said first resistor is a diffused resistor.

57. The circuit of claim 46, wherein each of said first and second capacitors comprises an MOS capacitor.

58. The circuit of claim 46, wherein said second capacitor has a capacitance of about 1 to 5 picofarads and said first capacitor has a capacitance of about one-fifth of said second capacitor.

59. The circuit of claim 46, wherein said first voltage is said regulated output voltage and said switching regulator controller circuit further comprises a voltage divider coupled to said feedback terminal for dividing said first voltage and generating said feedback voltage at said first input node of said error amplifier.

60. The circuit of claim 59, wherein said voltage divider comprises a first resistor and a second resistor connected in series between said feedback terminal and a first power supply, said voltage divider providing said feedback voltage at an output node between said first and second resistors.

61. The circuit of claim 46, wherein said first voltage is a divided voltage of said regulated output voltage generated by a voltage divider external to said switching regulator controller circuit, said feedback voltage being said first voltage.

62. The circuit of claim 46, wherein said output terminal of said switching regulator controller circuit is coupled to an output filter circuit for generating said regulated output voltage.

63. The circuit of claim 62, wherein said output filter circuit comprises an inductor and a capacitor connected in series between said output terminal and a ground terminal.

64. A method for providing zero compensation in a first circuit incorporated in a closed loop feedback system, said method comprising:

applying a feedback voltage at a first node of said first circuit to a first capacitor;

filtering out the DC component from said feedback voltage using said first capacitor;

amplifying said filtered feedback voltage;

applying said amplified filtered feedback voltage to a second capacitor coupled to a second node of said first circuit;

introducing a zero at said second node in said first circuit as a result of coupling said amplified filtered feedback voltage to said second capacitor;

coupling a first voltage to an input node of a second circuit in said first circuit, said first voltage corresponding to said feedback voltage;

determining a difference voltage between said first voltage and a reference voltage at said second circuit; and summing a voltage corresponding to said zero and said difference voltage.

65. The method of claim 64, wherein said applying said amplified filtered feedback voltage to a second capacitor functions to amplify the capacitance of said second capacitor for introducing a zero for canceling a pole in said closed loop feedback system.

66. The method of claim 64, wherein said second circuit is an error amplifier circuit.

67. A switching regulator controller circuit, comprising:

an output terminal providing a signal corresponding to a regulated output voltage;

a feedback terminal for receiving a first voltage corresponding to said regulated output voltage;

an error amplifier having a first input node coupled to receive a feedback voltage corresponding to said first voltage, a second input node coupled to a reference voltage and an error output node providing an error voltage indicative of the difference between said feedback voltage and said reference voltage;

a control circuit comprising an input node receiving said error voltage and an output node generating said signal corresponding to said regulated output voltage in response to said error voltage, said control circuit coupling said signal to said output terminal;

a compensation circuit comprising:
  a first capacitor coupled between said first input node of said error amplifier and a first node, said first capacitor for blocking out the DC component of said feedback voltage;
  an amplifier coupled between said first node and a second node; and
  a second capacitor coupled between said second node and said first input node of said error amplifier;

wherein said compensation circuit introduces a zero at said first input node of said error amplifier.

68. The circuit of claim 67, wherein said first voltage is a divided voltage of said regulated output voltage, and said compensation circuit further comprises a resistor coupled between said feedback terminal and said first input node of said error amplifier.

69. A switching regulator controller circuit, comprising:

an output terminal providing a signal corresponding to a regulated output voltage;

a feedback terminal for receiving a first voltage corresponding to said regulated output voltage;

an error amplifier having a first input node coupled to receive a feedback voltage corresponding to said first voltage, a second input node coupled to a reference voltage and an error output node providing an error voltage indicative of the difference between said feedback voltage and said reference voltage;

a control circuit comprising an input node receiving said error voltage and an output node generating said signal corresponding to said regulated output voltage in response to said error voltage, said control circuit coupling said signal to said output terminal;

a compensation circuit comprising:
  a first capacitor coupled between said first input node of said error amplifier and a first node, said first capacitor for blocking out the DC component of said feedback voltage;
  an amplifier coupled between said first node and a second node; and
  a second capacitor coupled between said second node and a third node coupled to a summing circuit;

wherein said summing circuit is coupled to sum a voltage corresponding to said zero and said error voltage of said error amplifier and generate a summed voltage at a summing node, said compensation circuit thereby introducing a zero at said summing node.

70. A switching regulator controller circuit, comprising:

an output terminal providing a signal corresponding to a regulated output voltage;

a feedback terminal for receiving a first voltage corresponding to said regulated output voltage;

an error amplifier having a first input node coupled to receive a feedback voltage corresponding to said first voltage, a second input node coupled to a reference voltage and an error output node providing an error voltage indicative of the difference between said feedback voltage and said reference voltage, said error amplifier comprising a first gain stage, a summing circuit and a second gain stage, connected in series;

a control circuit comprising an input node receiving said error voltage and an output node generating said signal corresponding to said regulated output voltage in response to said error voltage, said control circuit coupling said signal to said output terminal;

a compensation circuit comprising:
  a first capacitor coupled between said first input node of said error amplifier and a first node, said first capacitor for blocking out the DC component of said feedback voltage;
  an amplifier coupled between said first node and a second node; and
  a second capacitor coupled between said second node and a summing node coupled to said summing circuit of said error amplifier;

wherein said compensation circuit introduces a zero at said summing node of said error amplifier.

71. The circuit of claim 70, wherein said first gain stage is a cascode gain stage, and said summing circuit comprises a resistor.

* * * * *